United States Patent
Nomi et al.

(10) Patent No.: US 11,308,103 B2
(45) Date of Patent: Apr. 19, 2022

(54) DATA ANALYZING DEVICE AND DATA ANALYZING METHOD

(71) Applicant: Keyence Corporation, Osaka (JP)

(72) Inventors: Taiga Nomi, Osaka (JP); Yoshinori Nakano, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 390 days.

(21) Appl. No.: 16/507,063

(22) Filed: Jul. 10, 2019

(65) Prior Publication Data

US 2020/0257685 A1 Aug. 13, 2020

(30) Foreign Application Priority Data

Feb. 13, 2019 (JP) .............................. JP2019-023868

(51) Int. Cl.
*G06F 16/2458* (2019.01)
*G06N 5/02* (2006.01)

(52) U.S. Cl.
CPC ........... *G06F 16/2465* (2019.01); *G06N 5/02* (2013.01)

(58) Field of Classification Search
CPC .. G06F 16/2465; G06F 16/248; G06F 16/244; G06F 16/24556; G06F 3/04842; G06F 16/26; G06F 2111/10; G06F 16/9032; G06F 2216/03; G06N 5/02; G06N 20/00; G06N 5/04; G06N 5/046
USPC ........................................................ 707/776
See application file for complete search history.

(56) References Cited

U.S. PATENT DOCUMENTS

| | | | |
|---|---|---|---|
| 2013/0103764 A1* | 4/2013 | Verkasalo | G06Q 30/02 709/204 |
| 2015/0235143 A1* | 8/2015 | Eder | G16Z 99/00 706/12 |
| 2016/0078367 A1* | 3/2016 | Adjaoute | G06F 16/215 706/12 |

OTHER PUBLICATIONS

U.S. Appl. No. 16/507,058, filed Jul. 10, 2019 (118 pages).
U.S. Appl. No. 16/507,062, filed Jul. 10, 2019 (80 pages).
U.S. Appl. No. 16/507,064, filed Jul. 10, 2019 (134 pages).
U.S. Appl. No. 16/507,066, filed Jul. 10, 2019 (133 pages).
Samorani, et al., "A Randomized Exhaustive Propositionalization Approach for Molecule Classification," INFORMS Journal on Computing, vol. 23, No. 3, Aug. 31, 2010 (27 pages).

\* cited by examiner

*Primary Examiner* — Evan Aspinwall
(74) *Attorney, Agent, or Firm* — Kilyk & Bowersox, P.L.L.C.

(57) ABSTRACT

To make it possible to automatically generate an objective variable so that even those who are unskilled in data processing can freely conduct an analysis. It is recognized whether a type of an attribute value of each attribute of analysis target data is a numeric type indicating that it is a numeric value or a category type indicating that it is a category. At least one attribute that is a numeric type is set as an attribute of an aggregation target, at least one attribute that is a category type is set as an attribute of an aggregation unit, and for each category value of the attribute of the aggregation unit, a numeric value of the attribute of the aggregation target is aggregated based on a previously prepared aggregation function to generate a new objective variable candidate.

13 Claims, 20 Drawing Sheets

FIG. 12

| CANDIDATE | a) | b) | c) | d) | OBJECTIVE VARIABLE |
|---|---|---|---|---|---|
| 1 | AGE | GENDER | AVG | WHOLE PERIOD | AVERAGE AGE PER GENDER |
| 2 | AGE | GENDER | SUM | WHOLE PERIOD | TOTAL AGE PER GENDER |
| 3 | AGE | USER | AVG | WHOLE PERIOD | AVERAGE AGE PER USER |
| 4 | AGE | USER | SUM | WHOLE PERIOD | TOTAL AGE PER USER |
| 5 | PURCHASE AMOUNT | GENDER | AVG | WHOLE PERIOD | AVERAGE PURCHASE AMOUNT PER GENDER |
| 6 | PURCHASE AMOUNT | GENDER | SUM | WHOLE PERIOD | TOTAL PURCHASE AMOUNT PER GENDER |
| 7 | PURCHASE AMOUNT | USER | AVG | WHOLE PERIOD | AVERAGE PURCHASE AMOUNT PER USER |
| 8 | PURCHASE AMOUNT | USER | SUM | WHOLE PERIOD | TOTAL PURCHASE AMOUNT PER USER |
| 9 | AGE | GENDER | AVG | 2019/1 ONLY | AVERAGE AGE OF 2019/1 PER GENDER |
| 10 | AGE | GENDER | SUM | 2019/1 ONLY | TOTAL AGE OF 2019/1 PER GENDER |
| 11 | AGE | USER | AVG | 2019/1 ONLY | AVERAGE AGE AFTER 2019/1 PER USER |
| 12 | AGE | USER | SUM | 2019/1 ONLY | TOTAL AGE AFTER 2019/1 PER USER |
| 13 | PURCHASE AMOUNT | GENDER | AVG | 2019/1 ONLY | AVERAGE PURCHASE AMOUNT AFTER 2019/1 PER GENDER |
| 14 | PURCHASE AMOUNT | GENDER | SUM | 2019/1 ONLY | TOTAL PURCHASE AMOUNT AFTER 2019/1 PER GENDER |
| 15 | PURCHASE AMOUNT | USER | AVG | 2019/1 ONLY | AVERAGE PURCHASE AMOUNT AFTER 2019/1 PER USER |
| 16 | PURCHASE AMOUNT | USER | SUM | 2019/1 ONLY | TOTAL PURCHASE AMOUNT AFTER 2019/1 PER USER |

FIG. 14

| CANDIDATE | a) | b) | c) | d) | OBJECTIVE VARIABLE |
|---|---|---|---|---|---|
| 1 | ORDER | USER | NUMBER OF LINES | WHOLE PERIOD | NUMBER OF ORDERS PER USER |
| 2 | ORDER | USER | PRESENCE/ABSENCE | WHOLE PERIOD | PRESENCE/ABSENCE OF ORDER PER USER |
| 3 | ORDER | GENDER | NUMBER OF LINES | WHOLE PERIOD | NUMBER OF ORDERS PER GENDER |
| 4 | ORDER | GENDER | PRESENCE/ABSENCE | WHOLE PERIOD | PRESENCE/ABSENCE OF ORDER PER GENDER |
| 5 | ORDER | USER | NUMBER OF LINES | 2019/1 ONLY | NUMBER OF ORDERS OF 2019/1 PER USER |
| 6 | ORDER | USER | PRESENCE/ABSENCE | 2019/1 ONLY | PRESENCE/ABSENCE OF ORDER OF 2019/1 PER USER |
| 7 | ORDER | GENDER | NUMBER OF LINES | 2019/1 ONLY | NUMBER OF ORDERS OF 2019/1 PER GENDER |
| 8 | ORDER | GENDER | PRESENCE/ABSENCE | 2019/1 ONLY | PRESENCE/ABSENCE OF ORDER OF 2019/1 PER GENDER |

FIG. 15

| CANDIDATE NUMBER | OBJECTIVE VARIABLE |
|---|---|
| 1-1 | AGE |
| 1-2 | PURCHASE AMOUNT |
| 2-1 | GENDER=MALE |
| 2-2 | GENDER=FEMALE |
| 3-1 | AVERAGE AGE PER GENDER |
| 3-2 | TOTAL AGE PER GENDER |
| 3-3 | AVERAGE PURCHASE AMOUNT PER GENDER |
| 3-4 | TOTAL PURCHASE AMOUNT PER GENDER |
| 3-5 | AVERAGE PURCHASE AMOUNT PER USER |
| 3-6 | TOTAL PURCHASE AMOUNT PER USER |
| 3-7 | AVERAGE PURCHASE AMOUNT OF 2019/1 PER GENDER |
| 3-8 | TOTAL PURCHASE AMOUNT OF 2019/1 PER GENDER |
| 3-9 | AVERAGE PURCHASE AMOUNT OF 2019/1 PER USER |
| 3-10 | TOTAL PURCHASE AMOUNT OF 2019/1 PER USER |
| 4-1 | NUMBER OF ORDERS PER USER |
| 4-2 | PRESENCE/ABSENCE OF ORDER PER USER |
| 4-3 | NUMBER OF ORDERS PER GENDER |
| 4-4 | PRESENCE/ABSENCE OF ORDER PER GENDER |
| 4-5 | NUMBER OF ORDERS OF 2019/1 PER USER |
| 4-6 | PRESENCE/ABSENCE OF ORDER OF 2019/1 PER USER |
| 4-7 | NUMBER OF ORDERS OF 2019/1 PER GENDER |
| 4-8 | PRESENCE/ABSENCE OF ORDER OF 2019/1 PER GENDER |

FIG. 22

1. INPUT DATA

CUSTOMER TABLE

| USER | AGE | GENDER |
|---|---|---|
| user001 | 25 | MALE |
| user002 | 32 | MALE |
| user003 | 11 | FEMALE |
| user004 | 40 | FEMALE |

ORDER TABLE

| USER | PURCHASE DATE | PURCHASE AMOUNT |
|---|---|---|
| user001 | 2018/12/1 | 1200 |
| user002 | 2018/12/1 | 800 |
| user002 | 2019/1/3 | 400 |
| user003 | 2018/12/31 | 500 |
| user003 | 2019/1/12 | 100 |
| user003 | 2019/1/14 | 300 |

2. GENERATION OF OBJECTIVE VARIABLE CANDIDATE

CUSTOMER TABLE

| USER | AGE | GENDER |
|---|---|---|
| user001 | 25 | MALE |
| user002 | 32 | MALE |
| user003 | 11 | FEMALE |
| user004 | 40 | FEMALE |

ORDER TABLE

| USER | PURCHASE DATE | PURCHASE AMOUNT |
|---|---|---|
| user001 | 2018/12/1 | 1200 |
| user002 | 2018/12/1 | 800 |
| user002 | 2019/1/3 | 400 |
| user003 | 2018/12/31 | 500 |
| user003 | 2019/1/12 | 100 |
| user003 | 2019/1/14 | 300 |

AGGREGATION UNIT | OBJECTIVE VARIABLE

| USER | AVERAGE PURCHASE AMOUNT PER USER |
|---|---|
| user001 | 1200 |
| user002 | 600 |
| user003 | 300 |
| user004 | 0 |

AGGREGATION UNIT | OBJECTIVE VARIABLE

| GENDER | TOTAL PURCHASE AMOUNT PER GENDER |
|---|---|
| MALE | 2400 |
| FEMALE | 900 |

3. SELECTION OF OBJECTIVE VARIABLE

CUSTOMER TABLE

| USER | AGE | GENDER |
|---|---|---|
| user001 | 25 | MALE |
| user002 | 32 | MALE |
| user003 | 11 | FEMALE |
| user004 | 40 | FEMALE |

ORDER TABLE

| USER | PURCHASE DATE | PURCHASE AMOUNT |
|---|---|---|
| user001 | 2018/12/1 | 1200 |
| user002 | 2018/12/1 | 800 |
| user002 | 2019/1/3 | 400 |
| user003 | 2018/12/31 | 500 |
| user003 | 2019/1/12 | 100 |
| user003 | 2019/1/14 | 300 |

TARGET TABLE

| USER | AVERAGE PURCHASE AMOUNT PER USER |
|---|---|
| user001 | 1200 |
| user002 | 600 |
| user003 | 300 |
| user004 | 0 |

4. GENERATION OF FEATURE VALUE

| USER | OBJECTIVE VARIABLE AVERAGE PURCHASE AMOUNT PER USER | FEATURE VALUE AGE | FEATURE VALUE GENDER | FEATURE VALUE NUMBER OF PURCHASES ON WEEKDAYS | ... |
|---|---|---|---|---|---|
| user001 | 1200 | 25 | MALE | 1 | |
| user002 | 600 | 32 | MALE | 1 | |
| user003 | 300 | 11 | FEMALE | 2 | |
| user004 | 0 | 40 | FEMALE | 0 | |

FIG. 23

1. INPUT DATA

CUSTOMER TABLE

| USER | AGE | GENDER |
|---|---|---|
| user001 | 25 | MALE |
| user002 | 32 | MALE |
| user003 | 11 | FEMALE |
| user004 | 40 | FEMALE |

ORDER TABLE

| USER | PURCHASE DATE | PURCHASE AMOUNT |
|---|---|---|
| user001 | 2018/12/1 | 1200 |
| user002 | 2018/12/1 | 800 |
| user002 | 2019/1/3 | 400 |
| user003 | 2018/12/3 | 500 |
| user003 | 2019/1/12 | 100 |
| user003 | 2019/1/14 | 300 |

2. GENERATION OF OBJECTIVE VARIABLE CANDIDATE

CUSTOMER TABLE

| USER | AGE | GENDER |
|---|---|---|
| user001 | 25 | MALE |
| user002 | 32 | MALE |
| user003 | 11 | FEMALE |
| user004 | 40 | FEMALE |

ORDER TABLE

| USER | PURCHASE DATE | PURCHASE AMOUNT |
|---|---|---|
| user001 | 2018/12/1 | 1200 |
| user002 | 2018/12/1 | 800 |
| user002 | 2019/1/3 | 400 |
| user003 | 2018/12/3 | 500 |
| user003 | 2019/1/12 | 100 |
| user003 | 2019/1/14 | 300 |

AGGREGATION UNIT / OBJECTIVE VARIABLE

| USER | AVERAGE PURCHASE AMOUNT PER USER |
|---|---|
| user001 | 1200 |
| user002 | 600 |
| user003 | 300 |
| user004 | 0 |

AGGREGATION UNIT / OBJECTIVE VARIABLE

| GENDER | TOTAL PURCHASE AMOUNT PER GENDER |
|---|---|
| MALE | 2400 |
| FEMALE | 900 |

3. SELECTION OF OBJECTIVE VARIABLE

CUSTOMER TABLE

| USER | AGE | GENDER |
|---|---|---|
| user001 | 25 | MALE |
| user002 | 32 | MALE |
| user003 | 11 | FEMALE |
| user004 | 40 | FEMALE |

ORDER TABLE

| USER | PURCHASE DATE | PURCHASE AMOUNT |
|---|---|---|
| user001 | 2018/12/1 | 1200 |
| user002 | 2018/12/1 | 800 |
| user002 | 2019/1/3 | 400 |
| user003 | 2018/12/3 | 500 |
| user003 | 2019/1/12 | 100 |
| user003 | 2019/1/14 | 300 |

TARGET TABLE

| USER | AVERAGE PURCHASE AMOUNT PER USER |
|---|---|
| user001 | 1200 |
| user002 | 600 |
| user003 | 300 |
| user004 | 0 |

4. UPDATE OF ANALYSIS TARGET DATA

CUSTOMER TABLE

| USER | AGE | GENDER |
|---|---|---|
| user001 | 25 | MALE |
| user002 | 32 | MALE |
| user003 | 12 | FEMALE |
| user004 | 40 | FEMALE |
| user005 | 51 | MALE |

ORDER TABLE

| USER | PURCHASE DATE | PURCHASE AMOUNT |
|---|---|---|
| user001 | 2018/12/1 | 1200 |
| user001 | 2019/1/20 | 800 |
| user002 | 2018/12/1 | 800 |
| user002 | 2019/1/3 | 400 |
| user003 | 2018/12/3 | 500 |
| user003 | 2019/1/12 | 100 |
| user003 | 2019/1/14 | 300 |
| user003 | 2019/1/25 | 700 |

TARGET TABLE

| USER | AVERAGE PURCHASE AMOUNT PER USER |
|---|---|
| user001 | 1000 |
| user002 | 600 |
| user003 | 400 |
| user004 | 0 |
| user005 | 0 |

FIG. 24

1. INPUT DATA

CUSTOMER TABLE

| USER | AGE | GENDER |
|---|---|---|
| user001 | 25 | MALE |
| user002 | 32 | MALE |
| user003 | 11 | FEMALE |
| user004 | 40 | FEMALE |

ORDER TABLE

| USER | PURCHASE DATE | PURCHASE AMOUNT |
|---|---|---|
| user001 | 2018/12/1 | 1200 |
| user002 | 2018/12/1 | 800 |
| user002 | 2019/1/3 | 400 |
| user003 | 2018/12/31 | 500 |
| user003 | 2019/1/12 | 100 |
| user003 | 2019/1/14 | 300 |

2. GENERATION OF OBJECTIVE VARIABLE CANDIDATE

CUSTOMER TABLE

| USER | AGE | GENDER |
|---|---|---|
| user001 | 25 | MALE |
| user002 | 32 | MALE |
| user003 | 11 | FEMALE |
| user004 | 40 | FEMALE |

ORDER TABLE

| USER | PURCHASE DATE | PURCHASE AMOUNT |
|---|---|---|
| user001 | 2018/12/1 | 1200 |
| user002 | 2018/12/1 | 800 |
| user002 | 2019/1/3 | 400 |
| user003 | 2018/12/31 | 500 |
| user003 | 2019/1/12 | 100 |
| user003 | 2019/1/14 | 300 |

CANDIDATE OF OBJECTIVE VARIABLE

| AGGREGATION TARGET | AGGREGATION UNIT | AGGREGATION FUNCTION | NATURAL LANGUAGE EXPRESSION | SQL TEXT |
|---|---|---|---|---|
| PURCHASE AMOUNT | USER | AVERAGE | AVERAGE PURCHASE AMOUNT PER USER | SELECT SUM ("PURCHASE AMOUNT") FROM "ORDER TABLE" GROUP BY "USER"; |
| PURCHASE AMOUNT | USER | TOTAL | TOTAL PURCHASE AMOUNT PER USER | SELECT AVG ("PURCHASE AMOUNT") FROM "ORDER TABLE" GROUP BY "USER"; |
| PURCHASE AMOUNT | GENDER | AVERAGE | AVERAGE PURCHASE AMOUNT PER GENDER | SELECT SUM ("PURCHASE AMOUNT") FROM "ORDER TABLE" GROUP BY "GENDER"; |
| PURCHASE AMOUNT | GENDER | TOTAL | TOTAL PURCHASE AMOUNT PER GENDER | SELECT AVG ("PURCHASE AMOUNT") FROM "ORDER TABLE" GROUP BY "GENDER"; |

3. SELECTION OF OBJECTIVE VARIABLE

CUSTOMER TABLE

| USER | AGE | GENDER |
|---|---|---|
| user001 | 25 | MALE |
| user002 | 32 | MALE |
| user003 | 11 | FEMALE |
| user004 | 40 | FEMALE |

ORDER TABLE

| USER | PURCHASE DATE | PURCHASE AMOUNT |
|---|---|---|
| user001 | 2018/12/1 | 1200 |
| user002 | 2018/12/1 | 800 |
| user002 | 2019/1/3 | 400 |
| user003 | 2018/12/31 | 500 |
| user003 | 2019/1/12 | 100 |
| user003 | 2019/1/14 | 300 |

OBJECTIVE VARIABLE

| AGGREGATION TARGET | AGGREGATION UNIT | AGGREGATION FUNCTION | NATURAL LANGUAGE EXPRESSION | SQL TEXT |
|---|---|---|---|---|
| PURCHASE AMOUNT | USER | AVERAGE | AVERAGE PURCHASE AMOUNT PER USER | SELECT SUM ("PURCHASE AMOUNT") FROM "ORDER TABLE" GROUP BY "USER"; |

4. EXECUTION OF SQL

CUSTOMER TABLE

| USER | AGE | GENDER |
|---|---|---|
| user001 | 25 | MALE |
| user002 | 32 | MALE |
| user003 | 11 | FEMALE |
| user004 | 40 | FEMALE |

ORDER TABLE

| USER | PURCHASE DATE | PURCHASE AMOUNT |
|---|---|---|
| user001 | 2018/12/1 | 1200 |
| user002 | 2018/12/1 | 800 |
| user002 | 2019/1/3 | 400 |
| user003 | 2018/12/31 | 500 |
| user003 | 2019/1/12 | 100 |
| user003 | 2019/1/14 | 300 |

TARGET TABLE

| USER | AVERAGE PURCHASE AMOUNT PER USER |
|---|---|
| user001 | 1000 |
| user002 | 600 |
| user003 | 400 |
| user004 | 0 |
| user005 | 0 |

DATA ANALYZING DEVICE AND DATA ANALYZING METHOD

CROSS-REFERENCE TO RELATED APPLICATIONS

The present application claims foreign priority based on Japanese Patent Application No. 2019-023868, filed Feb. 13, 2019, the contents of which is incorporated herein by reference.

BACKGROUND OF THE INVENTION

1. Field of the Invention

The present invention relates to a data analyzing device and a data analyzing method.

2. Description of Related Art

A technique for trying to acquire a useful unknown knowledge from a large volume of information, generally called "data mining", is conventionally known. A typical method of data mining involves a pre-processing step, a feature extracting step, a model learning step, and a post-processing step that are sequentially executed. In the pre-processing step, operations such as collecting data necessary for analysis, and removing unnecessary noise from the data and filling a missing item to improve the efficiency of the analysis are performed. These operations are collectively referred as "ETL (extract, transform, and load)". In the feature extracting step, a feature that exists in the original data is manipulated to generate a new feature more useful for the analysis. In the model learning step, data that is prepared in the pre-processing step and the feature extracting step is input to a machine learning algorithm to obtain an analysis result. In the post-processing step, the analysis result obtained in the model learning step is subjected to a process such as outputting it to an external device or generating a report based thereon.

To design an optimal feature, trial and error by an experienced analyst is necessary, resulting in taking a long time to analyze data. In response to this situation, a technique is disclosed in, for example, "A Randomized Exhaustive Propositionalization Approach for Molecule Classification" (INFORMS Journal on Computing, Vol. 23, No. 3 Published Aug. 31, 2010). This known technique performs automatic generation of a new feature from data.

The technique disclosed in such a literature involves comprehensively applying a preliminarily defined series of arithmetic operators, such as a plus (+) operator, a minus (−) operator, a multiplication (×) operator, and a division (÷) operator, to an original feature, thereby automatically generating a large amount of new features.

When performing data analysis using a prediction model, it is necessary to specify an objective variable. The objective variable includes, for example, "average unit purchase price per customer", "weekly sales at each store", "presence/absence of repeat purchase per customer", etc., and the objective variable is selected from attributes in the data of an analysis target according to a target that an analyst wants to analyze.

However, as mentioned above, the objective variable is usually an aggregation value such as an average aggregation value and a sum aggregation value, and these aggregation values are usually not included in the attributes of tables held in a general relational database. For this reason, even though it is possible to automatically generate new feature values as in the aforementioned document, the analyst has to generate the objective variable by himself/herself.

In addition, when the objective variable is not included in the attributes, it is necessary to calculate in advance the aggregation value using advanced programming such as SQL, and it is difficult for those who are unskilled in data processing to conduct an analysis freely.

SUMMARY OF THE INVENTION

The invention has been made in view of the above problems, and an object of the invention is to make it possible to automatically generate an objective variable so that even those who are unskilled in data processing can freely conduct an analysis.

In order to achieve the object, in a first invention, a data analyzing device for analyzing analysis target data includes a data input unit which receives an input of analysis target data including a plurality of attributes, a type recognizing unit which recognizes whether a type of an attribute value of each attribute of the analysis target data input to the data input unit is a numeric type indicating that it is a numeric value or a category type indicating that it is a category, an objective variable candidate generating unit which sets at least one attribute that is a numeric type recognized by the type recognizing unit as an attribute of an aggregation target, sets at least one attribute that is a category type recognized by the type recognizing unit as an attribute of an aggregation unit, and aggregates, for each category value of the attribute of the aggregation unit, a numeric value of the attribute of the aggregation target based on a previously prepared aggregation function to generate a new objective variable candidate, a display unit which displays the new objective variable candidate generated by the objective variable candidate generating unit, a selection receiving unit which receives a selection of an objective variable by a user from among objective variable candidates displayed by the display unit, and an analyzing unit which generates a prediction model for predicting the objective variable selected by the selection receiving unit.

According to this configuration, when the analysis target data including a plurality of attributes is input, it is recognized by the type recognizing unit whether the type of the attribute value of each attribute is a numeric type or a category type. At least one attribute that is a numeric type is set as an attribute of the aggregation target, at least one attribute that is a category type is set as an attribute of the aggregation unit, and for each category value of the attribute of the aggregation unit, the numeric value of the attribute of the aggregation target is aggregated based on a previously prepared aggregation function to automatically generate a new objective variable candidate. The generated new objective variable candidate is displayed by the display unit, and thus the user can grasp the objective variable candidate. When the user selects an objective variable, a prediction model for predicting the selected objective variable is generated. As a result, the desired objective variable is predicted by the prediction model without using advanced programming such as SQL. Therefore, even users who are unskilled in data processing can freely conduct an analysis.

In a second invention, the display unit is configured to be capable of displaying an original attribute of the analysis target data input to the data input unit and a new objective variable candidate generated by the objective variable candidate generating unit, and the selection receiving unit is configured to receive a selection of an objective variable by a user from the original attribute and the new objective variable candidate displayed by the display unit.

According to this configuration, the user of the data analyzing device can select not only from the newly generated objective variable candidate but also from the original attribute included in the analysis target data input to the data input unit as the objective variable.

In a third invention, the display unit is configured to be capable of displaying a value obtained by converting an attribute value of an original attribute of the analysis target data input to the data input unit into a flag, and the selection receiving unit is configured to receive a selection of an objective variable by a user from the original attribute, the new objective variable candidate, and the value converted into the flag displayed by the display unit.

That is, for example, by applying a predetermined conditional expression to the original attribute, it is possible to convert into binary information, and by this conversion, it is possible to obtain a value obtained by converting the attribute value of the original attribute of the analysis target data into a flag. In the invention, it is possible to receive the selection of an objective variable by the user even from among the values converted into flags.

In a fourth invention, the objective variable candidate generating unit is configured to set at least one attribute that is a numeric type recognized by the type recognizing unit as an attribute of an aggregation target, set at least one attribute that is a numeric type recognized by the type recognizing unit as an attribute of an aggregation unit, and aggregate, for each numeric value of the attribute of the aggregation unit, a numeric value of the attribute of the aggregation target based on a previously prepared aggregation function to generate a new objective variable candidate.

According to this configuration, it is possible to automatically generate not only an objective variable candidate where the attribute of the aggregation target is a numeric type and the attribute of the aggregation unit is a category type, but also an objective variable candidate where the attribute of the aggregation target is a numeric type and the attribute of the aggregation unit is also a numeric type.

In a fifth invention, the objective variable candidate generating unit is configured to automatically generate a predetermined period as an aggregation condition when the analysis target data input to the data input unit includes a date type attribute.

According to this configuration, when the analysis target data includes a date type attribute, a predetermined period such as the latest one month and the latest one week is automatically generated as an aggregation condition. The date type is, for example, year-month-date, time, etc.

In a sixth invention, the data analyzing device includes a score calculating unit which calculates a score representing usefulness of an objective variable candidate, and the display unit is configured to be capable of displaying an objective variable candidate having a score calculated by the score calculating unit equal to or greater than a predetermined value.

According to this configuration, when a large number of objective variable candidates are generated, it is possible to only display objective variable candidates with high usefulness to the user on the display unit. Therefore, the user can easily select objective variables. It is also possible to display objective variable candidates having a score equal to or greater than a predetermined value in a ranking format from the highest. In addition, the displayable number of objective variable candidates having a score equal to or greater than a predetermined value may be limited to, for example, 5 or 10.

In a seventh invention, the score calculating unit is configured to calculate a score based on the number of lines of the generated objective variable.

That is, for example, when the analysis target data includes gender, only two lines of "male" and "female" of objective variables will be generated for gender. When the number of lines of the objective variables is small, it is not possible to perform an accurate analysis. Therefore, in such a case, the score representing the usefulness of the objective variable candidate is lowered. On the other hand, since it is considered that an accurate analysis becomes possible when the number of lines of the objective variables is large, the score representing the usefulness of the objective variable candidate is made to be high. In a word, the score can be changed according to the number of lines of the objective variables.

In an eighth invention, the score calculating unit is configured to calculate a score based on a variance of the generated objective variables.

That is, as in a case where the variance of the objective variables is 0, for example, when the values of the objective variables are all the same, there is no difference among the objective variables and it is not possible to perform a meaningful analysis. In such a case, the score representing the usefulness of the objective variable candidate is lowered. On the other hand, when the variance of the objective variables is large, it means that there is a difference in the values of the objective variables, which makes it possible to perform a meaningful analysis. In this case, the score representing the usefulness of the objective variable candidate is made to be high. In a word, the score can be changed according to the variance of the objective variables.

In a ninth invention, the objective variable candidate generating unit is configured to delete, after the generation of objective variable candidates, an objective variable candidate that meets a predetermined condition.

According to this configuration, for example, when it is known that there is always only one type of aggregation target with respect to an aggregation unit, it is not possible to perform a meaningful analysis, and thus an objective variable candidate that meets this condition can be deleted.

In a tenth invention, the data analyzing device includes a feature value automatic generating unit which automatically generates a new feature value by applying a predetermined function to attributes excluding at least a part of attribute values of attributes of the aggregation target used by the objective variable candidate generating unit when generating an objective variable selected by the selection receiving unit.

According to this configuration, when the user selects an objective variable, a new feature value is automatically generated. In this case, a predetermined function is applied to attributes excluding at least a part of attribute values of attributes of the aggregation target used when generating an objective variable, and thus a situation in which the information of the objective variable is unintentionally leaked to the feature value is avoided. Therefore, leaks can be automatically prevented even for those who are not skilled in machine learning.

In an eleventh invention, the data analyzing device includes a feature value automatic generating unit which automatically generates a new feature value by applying a predetermined function to the original attribute or a combination of a plurality of attributes included in the analysis target data, and excludes from the generated feature values the feature value including information of at least a part of attribute values of attributes of the aggregation target used for the objective variable selected by the selection receiving unit to generate a final feature value.

According to this configuration, when the user selects an objective variable, a new feature value is automatically generated. In this case, a feature value including the information of at least a part of attribute values of attributes of the aggregation target used for the objective variable is excluded to obtain the final feature value, and thus a situation in which the information of the objective variable is unintentionally leaked to the feature value is avoided. Therefore, leaks can be automatically prevented even for those who are not skilled in machine learning.

In a twelfth invention, the data analyzing device includes a keyword input unit which receives an input of keyword information from a user, and the display unit is configured to be capable of displaying an objective variable candidate related to the keyword information input by the user via the keyword input unit.

According to this configuration, when the user inputs keyword information, an objective variable candidate related to the keyword information is displayed on the display unit, and thus the selection of the objective variable candidate can be easily performed.

In a thirteenth invention, the data analyzing device includes an attribute selecting unit which receives a selection input from a user regarding an attribute of an aggregation target or an aggregation unit, and the display unit is configured to display an objective variable candidate generated by using an attribute input by the user via the attribute selecting unit as an aggregation target or an aggregation unit.

According to this configuration, when the user performs an input regarding an attribute of an aggregation target or an aggregation unit, an objective variable candidate generated using the input attribute as the aggregation target or the aggregation unit is displayed by the display unit, and thus the selection of the objective variable candidate can be easily performed.

Either of the generation of the objective variable candidate by the objective variable candidate generating unit and the reception of the input from the user regarding the attribute of the aggregation target or the aggregation unit may be first. When the input from the user regarding the attribute of the aggregation target or the aggregation unit is received after the generation of the objective variable candidate by the objective variable candidate generating unit, it is possible to extract from the generated objective variable candidates the objective variable candidate generated using the attribute input by the user as the aggregation target or the aggregation unit to display on the display unit. When the input from the user regarding the attribute of the aggregation target or the aggregation unit is received before the generation of the objective variable candidate by the objective variable candidate generating unit, it is only necessary that the objective variable candidate generating unit generates an objective variable candidate using the attribute input by the user as the aggregation target or the aggregation unit and the generated objective variable candidate is displayed on the display unit.

In a fourteenth invention, a data analyzing method for analyzing analysis target data includes: receiving an input of analysis target data including a plurality of attributes, recognizing whether a type of an attribute value of each attribute of the analysis target data input is a numeric type indicating that it is a numeric value or a category type indicating that it is a category, generating a new objective variable candidate by setting at least one attribute that is a numeric type recognized as an attribute of an aggregation target, setting at least one attribute that is a category type recognized as an attribute of an aggregation unit, and aggregating, for each category value of the attribute of the aggregation unit, a numeric value of the attribute of the aggregation target based on a previously prepared aggregation function, displaying the new objective variable candidate generated, receiving a selection of an objective variable by a user from among objective variable candidates displayed, and generating a prediction model for predicting the objective variable selected.

According to the invention, it is possible to set at least one attribute that is a numeric type as an attribute of an aggregation target, set at least one attribute that is a category type as an attribute of an aggregation unit, and aggregate, for each category value of the attribute of the aggregation unit, a numeric value of the attribute of the aggregation target based on a previously prepared aggregation function to automatically generate and display a new objective variable candidate. Further, it is possible to receive a selection of an objective variable by a user from among the displayed objective variable candidates and to automatically generate a prediction model for predicting the selected objective variable, and thus even those who are unskilled in data processing can conduct an analysis freely.

BRIEF DESCRIPTION OF THE DRAWINGS

FIG. 12 is a diagram showing objective variable candidates generated by aggregating original attribute values per group of other attribute values;

FIG. 14 is a diagram showing objective variable candidates generated by aggregating tables per group of other tables;

FIG. 15 is a diagram showing objective variable candidates automatically generated by an objective variable candidate generating unit;

FIG. 22 is a diagram showing a method of holding internal data according to a first example;

FIG. 23 is a diagram showing a method of holding internal data according to a second example; and FIG. 24 is a diagram showing a method of holding internal data according to a third example.

DESCRIPTION OF EMBODIMENTS

Embodiments of the invention are explained in detail below with reference to the drawings. However, the following description of the preferred embodiments is merely illustrative in nature, and is not intended to limit the invention, its applications, or its use.

Figure 1:
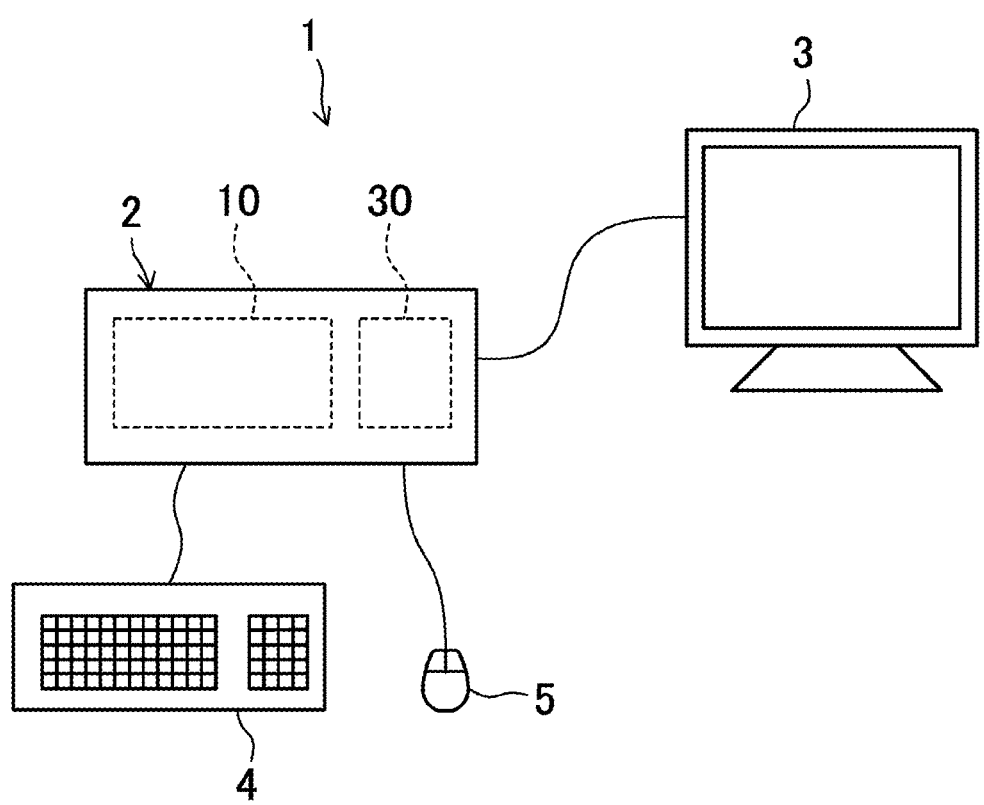
FIG. 1 is a diagram showing a schematic configuration of a data analyzing device according to an embodiment of the invention.
Figure 2:
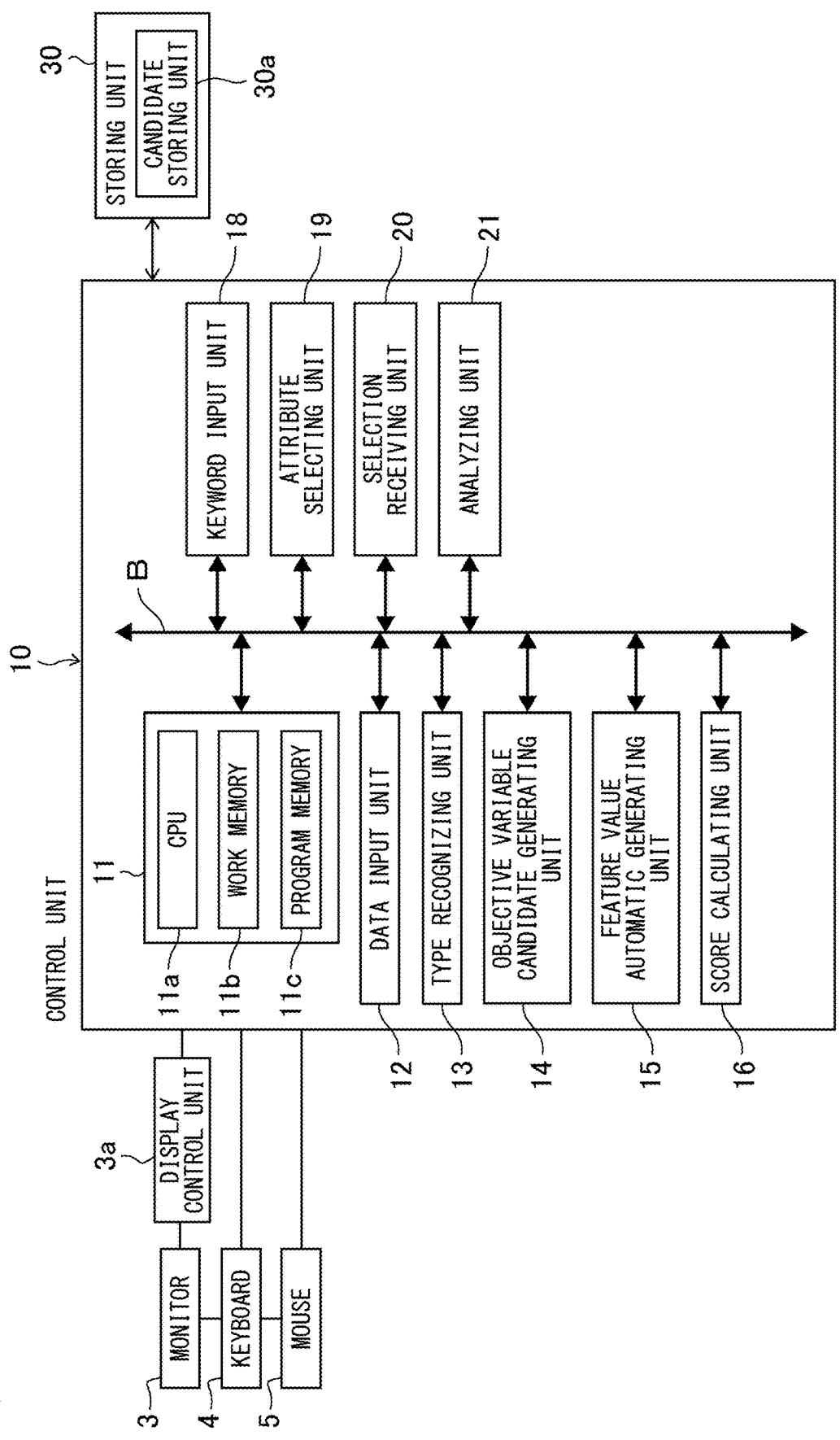
FIG. 2 is a block diagram of the data analyzing device.

FIG. 1 is a diagram showing a schematic configuration of a data analyzing device 1 according to an embodiment of the invention, and FIG. 2 is a block diagram of the data analyzing device 1. The data analyzing device 1 is a device that analyzes analysis target data, and by using the data analyzing device 1, a data analyzing method can be executed. The data analyzing device 1 and the data analyzing method can be used, for example, in performing the so-called data mining, which attempts to obtain useful knowledge that has been unknown from among a large amount of information.

Data Analysis Procedure

Figure 3:
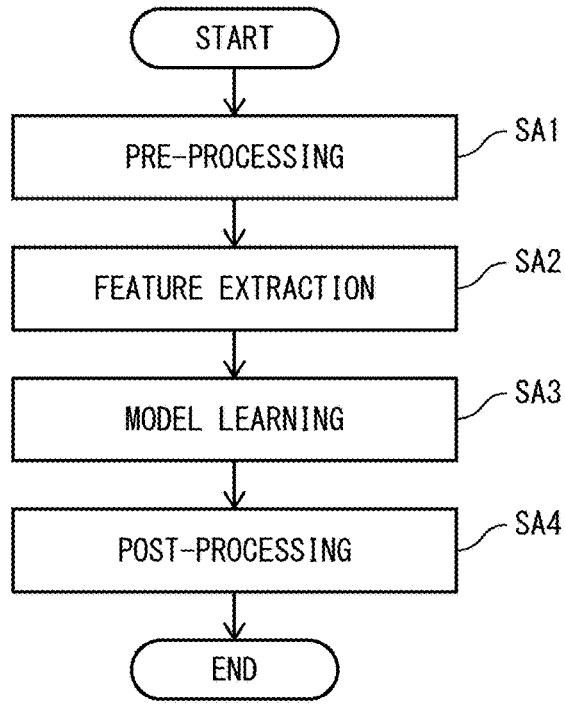
FIG. 3 is a flowchart showing a procedure of data analysis.

A general procedure of data analysis will be described based on the flowchart shown in FIG. 3. After the start, a pre-processing step is executed in step SA1. In the pre-processing step, data necessary for analysis, that is, analysis target data, is collected, and work such as removing unnecessary noise from the data and filling in missing items is performed in order to enhance the effect of the analysis. This work is called ETL: Extract/Transform/Load. In step SA2, a feature extraction step is executed. In the feature extraction step, feature values existing in the original data are processed to generate new feature values that are more useful for the analysis. In step SA3, a model learning step is executed. In the model learning step, the data prepared in the pre-processing step and the feature extraction step is input to a machine learning algorithm to obtain an analysis result. In step SA4, a post-processing step is executed. In the post-processing step, processing such as outputting the analysis result obtained in the model learning step to an external device and creating a report based on the analysis result is performed.

Overall Configuration of Data Analyzing Device 1

As shown in FIG. 1 and FIG. 2, the data analyzing device 1 includes a device main body 2, a monitor 3, a keyboard 4, and a mouse 5, and the monitor 3, the keyboard 4, and the mouse 5 are connected to the device main body 2. For example, the data analyzing device 1 can be obtained by installing a program capable of executing control content and processing content which will be described later in a general-purpose personal computer, and the data analyzing device 1 may also be configured by special-purpose hardware in which the program is installed. For example, any one of the following forms is fine: a form in which, by directly installing the program in a personal computer of a user, the personal computer is used as the data analyzing device 1; a form in which the program is installed in a server to construct the data analyzing device 1, and each user accesses and uses the data analyzing device 1 via a network from the browser of his or her own personal computer; and a form in which the data analyzing device 1 is a service placed on the cloud, and each user accesses the data analyzing device 1 on the cloud from the browser of his or her own personal computer.

Further, the device main body 2 and the monitor 3 may be integrated, or a part of the device main body 2 or a part of the functions executed by the device main body 2 may be incorporated into the monitor 3.

The data analyzing device 1 incorporates a communication module (not shown) and is configured to be capable of communicating with the outside. This enables, for example, downloading of data from an external server via Internet connection, etc.

The keyboard 4 and the mouse 5 are not only operating units operating the data analyzing device 1 but also input units inputting various kinds of information, selecting units performing selecting operations, etc. In addition to the keyboard 4 and the mouse 5, or in place of the keyboard 4 and the mouse 5, a touch panel type input device, a voice input device, a pen type input device and the like may be used.

Configuration of Monitor 3

The monitor 3 shown in FIG. 1 includes, for example, an organic EL display or a liquid crystal display, etc., and may be called a display unit alone, or the monitor 3 may be combined with a display control unit 3a shown in FIG. 2 to be called a display unit. The display control unit 3a may be incorporated in the monitor 3 or may be incorporated in the device main body 10. The display control unit 3a includes a display DSP and the like which displays an image on the monitor 3. The display control unit 3a may also include a video memory such as a VRAM which temporarily stores image data when displaying an image. The display control unit 3a transmits a control signal for displaying a predetermined image on the monitor 3 based on a display instruction (display command) sent from a CPU 11a of a main control unit 11 which will be described later. For example, in addition to various user interfaces that will be described later, control signals for displaying the operation contents of the user using an icon, the keyboard 4, and the mouse 5 on the monitor 3 are also transmitted. In addition, a pointer and the like operable by the mouse 5 can be displayed on the monitor 3.

By making the monitor 3 a touch operation panel type monitor, the monitor 3 can have a function of inputting various kinds of information, a function of operating the data analyzing device 1, and a selection operation function.

Overall Configuration of Device Main Body 2

The device main body 2 shown in FIG. 1 includes a control unit 10 and a storing unit 30. The storing unit 30 includes a hard disk drive, a solid state drive (SSD), and the like. The storing unit 30 is connected to the control unit 10 and is controlled by the control unit 10. The storing unit 30 can save various kinds of data, and can also read the saved data.

Control Unit 10

Though not specifically shown, the control unit 10 may include an MPU, a system LSI, a DSP, a special-purpose hardware, etc. The control unit 10 bears various functions as will be described later. However, these functions may be realized by a logic circuit, or may be realized by executing software.

As shown in FIG. 2, the control unit 10 includes the main control unit 11, a data input unit 12, a type recognizing unit 13, an objective variable candidate generating unit 14, a feature value automatic generating unit 15, a score calculating unit 16, a keyword input unit 18, an attribute selecting unit 19, a selection receiving unit 20, and an analyzing unit 21. Each unit of the control unit 10 is described separately for each part above. However, it may be configured that a same part executes a plurality of types of processing, or it may be configured that it is further divided and a plurality of parts executes one process in cooperation. Each of the aforementioned hardware is connected via an electrical communication path (wiring) such as a bus B so as to enable bidirectional communication or unidirectional communication as required.

The main control unit 11 performs numerical calculation, arithmetic processing, and various kinds of information processing based on various programs, and also controls each part of the hardware. The main control unit 11 includes the CPU 11a that functions as a central processing unit, a work memory 11b such as RAM that functions as a work area when the main control unit 11 executes various programs, and a program memory 11c such as ROM, flash ROM and EEPROM in which a startup program, an initialization program, etc. are stored.

Figure 5:
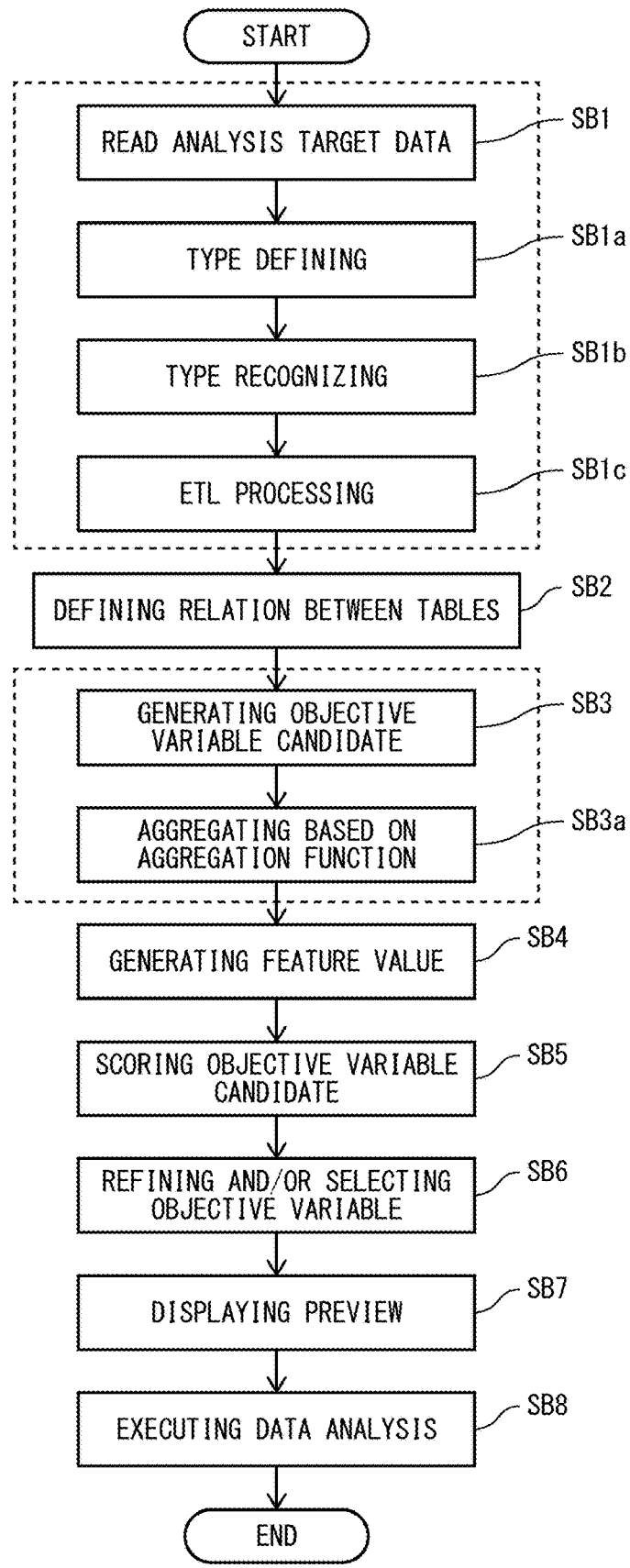
FIG. 5 is a flowchart showing operations of the data analyzing device.

The data input unit 12 is a part that receives an input of analysis target data including a plurality of attributes, and by the data input unit 12, it is possible to execute the processing of step SB1 in the flowchart shown in FIG. 5, that is, the data input step. Here, it is assumed that the analysis target data to be input is data (table) of one or more table forms. The data input unit 12 generates a user interface for data input 50 to display on the monitor 3, and also receives a user's operation performed on the user interface for data input 50. The user's operation includes, for example, operation of the keyboard 4, operation of the mouse 5 (including button click, drag and drop, rotation of a wheel, etc.), tap operation to a touch panel type input device, drag operation, etc., and may be any of these operations. The same applies below.

Here, the analysis target data is data including a plurality of attributes. An attribute is an item including a pair of name and type included in the analysis target data, and for example, a user ID, age, gender and the like generally exist. An attribute type is a classification that defines what value an attribute can be, and the method of classification differs in systems. For example, in a general relational database, any one of data types such as INT type (integer), REAL type (real number), DATE type (date), and VARCHAR type (character string) is assigned per attribute. In an actual database, various types other than these types are used. Examples of the INT type include age and purchase price, examples of the REAL type include interest rates, examples of the DATE type include the date of birth, and examples of the VARCHAR type include user names, email addresses, etc.

In data analyzing, after the analysis target data is taken from a relational database on the data analyzing device 1 (or a program) that performs data analysis, an attribute type on the data analyzing device 1 is defined in step SB1a in the flowchart shown in FIG. 5. In this example, three kinds of types, i.e., a numeric type of attribute including integer and real number, a date type of attribute including time information such as year-month-date, and a category type of attribute which is neither a numeric type nor a date type, are defined as types on the data analyzing device 1. When defining the type of attribute on the data analyzing device 1, the data analyzing device 1 may automatically define from the types of the relational database based on a predetermined rule, or a user of the data analyzing device 1 may define. In addition, it may be set that after the data analyzing device 1 automatically defines, the user of the data analyzing device 1 may confirm and make corrections when necessary.

That is, the attribute type included in the analysis target data includes a numeric type indicating that it is a numeric value, a date type indicating that it is a date, and a category type indicating that it is a category other than the numeric value and the date. The type recognizing unit 13 shown in FIG. 2 is configured to recognize whether a type of an attribute value of each attribute of the analysis target data input to the data input unit 12 is a numeric type indicating that it is a numeric value or a category type indicating that it is a category by determining the types of the attributes included in the analysis target data. The type recognizing unit 13 is a part that executes a type recognizing step of step SB1b in the flowchart shown in FIG. 5. The type recognizing unit 13 can also recognize whether the type of an attribute value of each attribute of the analysis target data is a date type. The result recognized by the type recognizing unit 13 is output to the objective variable candidate generating unit 14. The result recognized by the type recognizing unit 13 may also be stored in the storing unit 30. In this case, the objective variable candidate generating unit 14 reads the recognition result of the type recognizing unit 13 from the storing unit 30.

In addition, it is fine that part of the analysis target data is missing. In this case, as shown in step SB1c in the flowchart shown in FIG. 5, it is only necessary to perform an operation (ETL processing) of filling in the missing items. Details of the ETL processing will be described later.

Figure 4:
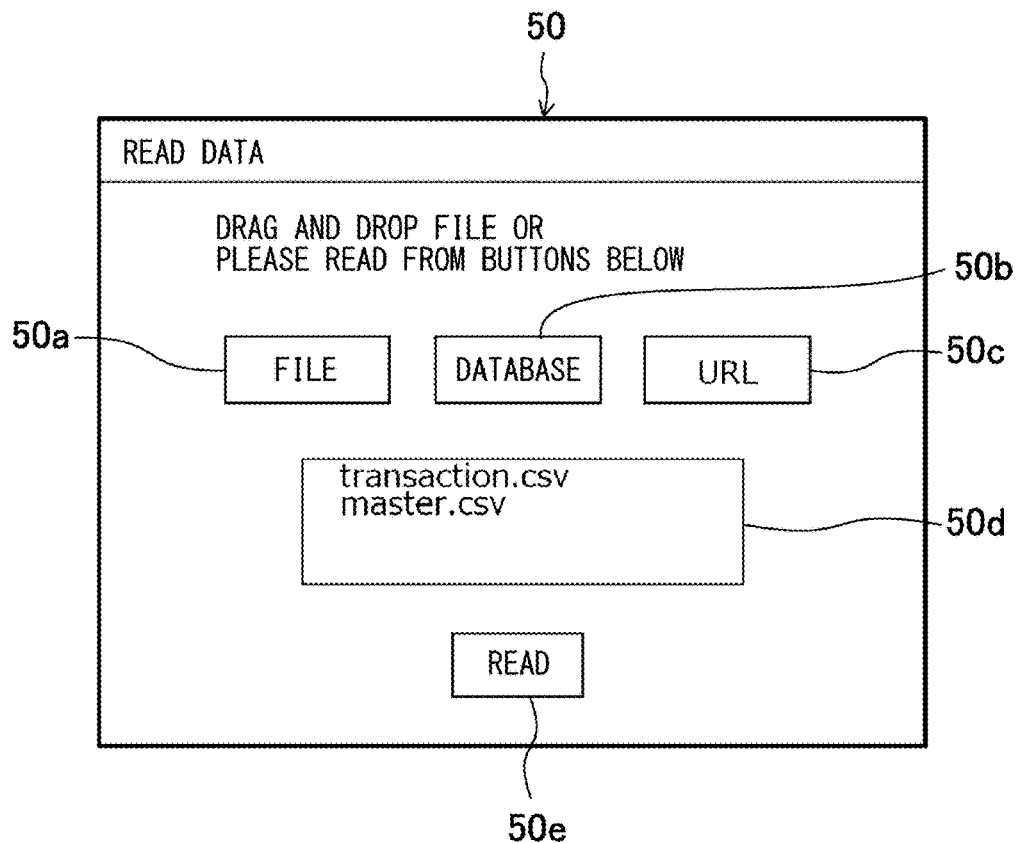
FIG. 4 is a diagram showing a user interface for data input.

The user interface for data input 50 shown in FIG. 4 is provided with a file selecting button 50a, a database selecting button 50b, a URL specifying button 50c, a database display region 50d, and a reading start button 50e. The arrangement of each button can be set freely.

For example, when a file storing the analysis target data is saved in an external storing device or the storing unit 30 and is on the desktop or in an open folder, the user performs an operation of dragging and dropping the file to the database display region 50d. As a result, the name of the file storing the analysis target data is displayed in the database display region 50d. Then, when the reading start button 50e is pressed, the file displayed in the database display region 50d is read and saved in a predetermined region of the storing unit 30.

When the analysis target data is on a database, the user presses the database selecting button 50b. When the database selecting button 50b is pressed, a setting screen (not shown) for connecting to the database is displayed, prompting the user to input a table name and, when necessary, a password. Then, when the reading start button 50e is pressed, the analysis target data is read and saved in a predetermined region of the storing unit 30 in a predetermined file format, and the file name storing the analysis target data is displayed in the database display region 50d.

When the analysis target data is on the Internet or a server, the user presses the URL specifying button 50c. When the URL specifying button 50c is pressed, a URL input screen (not shown) is displayed, prompting the user to input a URL. Then, when the reading start button 50*e* is pressed, the analysis target data is downloaded and is read and saved in a predetermined region of the storing unit 30 in a predetermined file format, and the file name storing the analysis target data is displayed in the database display region 50*d*.

The file storing the analysis target data may be only one or plural. FIG. 4 shows a case where analysis data stored in two files of "transaction" and "master" is read. Files may be read by a method other than the three methods described above. Although the file format is csv format, it may be other formats, for example, a table on a relational database.

After the analysis target data is read, the type (for example, a numeric type, a category type, a date type) for analysis is set for each attribute. The type information may be analogized from the type on the relational database, for example, "being analogized as a numeric type in the case of INT type" on the database, or a specification of the type from the user may be received.

After the analysis target data is read, removal of missing values of the analysis target data and filling in the analysis target data may be performed when necessary. This may be performed by the user, or the data analyzing device 1 may perform the portion that can be executed by the data analyzing device 1. For example, missing value removal and filling processing that removes a random missing value and adds a missing item, replacement processing that replaces an existing value with another value, deletion processing that deletes a random column, addition processing that adds a random column, numerical expression input processing that inputs a random numerical expression in a cell, information addition processing that adds predetermined information to a random column, etc. can be performed. The analysis target data can be processed by such processing. Therefore, the data analyzing device 1 can perform ETL processing and by performing the ETL processing, the analysis target data can be transformed into a form more suitable for analysis. As a result, the accuracy of the analysis result can be further improved. When the ETL processing is completed, it is possible to proceed to the next step by operating a completion button and the like on the user interface which is not shown in the drawings. It is also possible to proceed to the next step without performing the ETL processing.

The above is the processing executed in step SB1 in the flowchart shown in FIG. 5. Thereafter, the process proceeds to step SB2 and the relation between tables is defined. The definition of the relation between the tables is executed by the user of the data analyzing device 1. When the control unit 10 detects that the reading of the analysis target data, or the ETL processing of the analysis target data after reading has been completed, the control unit 10 generates a user interface for relation definition 51 shown in FIG. 6 to display on the monitor 3 and receives the user's operation performed on the user interface for relation definition 51.

The user interface for relation definition 51 is provided with a first table name display region 51*a* and a second table name display region 51*b* which display the names of two tables forming a set. Further, the user interface for relation definition 51 is provided with a first attribute selection region 51*c* which selects and displays one of a plurality of attributes included in the table displayed in the first table name display region 51*a*, and a second attribute selection region 51*d* which selects and displays one of a plurality of attributes included in the table displayed in the second table name display region 51*b*. The first attribute selection region 51*c* and the second attribute selection region 51*d* may be configured, for example, in a form of a pull-down menu, and by clicking each of them, it is possible to display the names of the plurality attributes included in each table in a list and to select a desired attribute therefrom. The selected attribute is an attribute specified by the user, and only the name of the specified attribute is displayed in the first attribute selection region 51*c* and the second attribute selection region 51*d* while the names of the attributes that are not specified are not displayed.

Figures 6, 7:
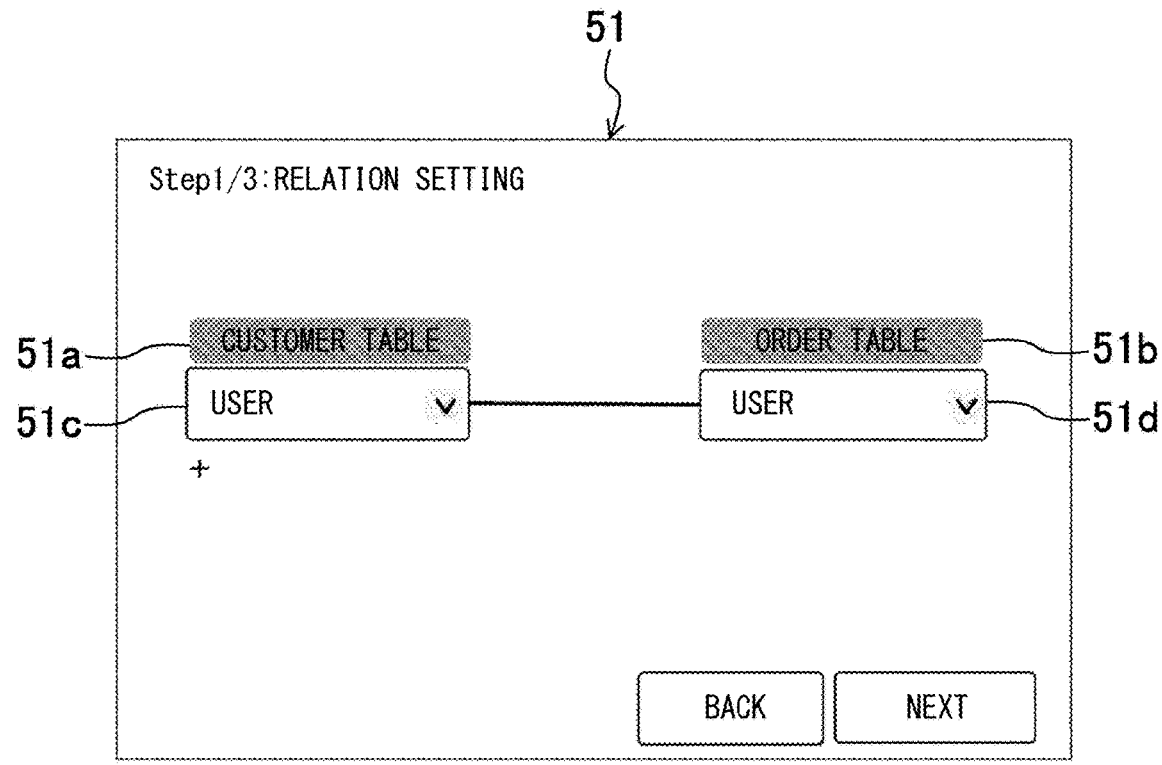
FIG. 6 is a diagram showing a user interface for relation definition.
FIG. 7 is a diagram showing an example of a relation between tables.

As shown in an example in the user interface for relation definition 51, the definition of the relation between the tables is carried out by specifying the names of the attributes respectively for the set of tables (customer table and order table). As shown in FIG. 7, lines in which the values of the specified attributes match are considered to correspond to each other. In the example shown in FIG. 7, examples that "user 001" of "customer table" corresponds to "user 001" of "order table", "user 002" of "customer table" corresponds to "user 002" of "order table", and "user 004" of "customer table" corresponds to "user 004" of "order table" are indicated by relation lines L.

In a case of a relational database, the correspondence between table attributes may have already been defined on the database side. The correspondence defined on the database side is called foreign key constraint. When there is a foreign key constraint, the already set correspondence may be read by the data analyzing device 1 side in step SB1 and the data analyzing device 1 may automatically set the definition of the relation between the tables.

Figure 8:
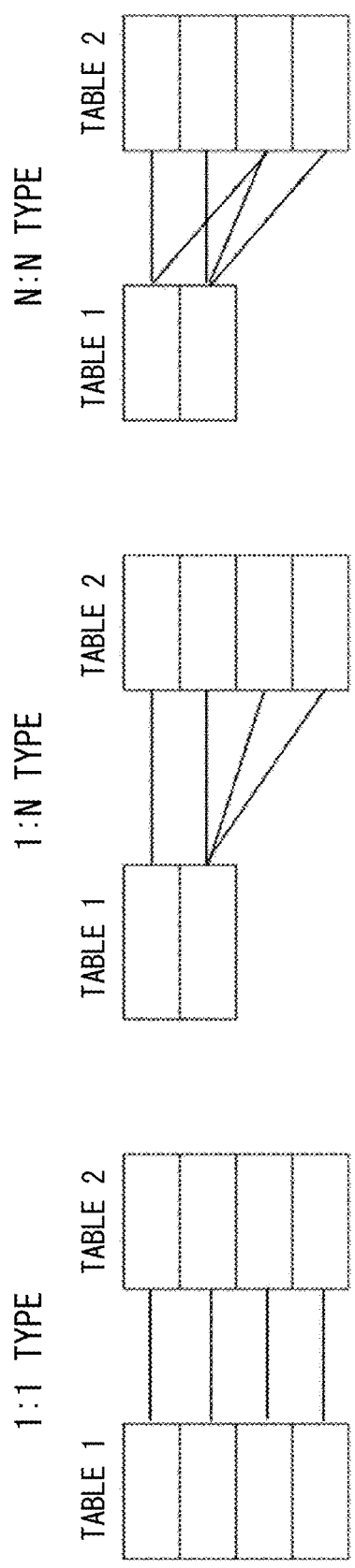
FIG. 8 is a diagram explaining three types of multiplicity.

When the relation between the tables is defined as described above, the data analyzing device 1 automatically determines multiplicity for each correspondence. Automatic determination of multiplicity is performed by the control unit 10. As shown in FIG. 8, there are three types of multiplicity, i.e., 1:1 type, 1:N type, and N:N type, and it can be determined by referring to the contents of the tables. The 1:1 type is a relation in which one line of one table corresponds to one line of the other table. The 1:N type is a relation in which one line of one table corresponds to a plurality of lines of the other table. The N:N type is a relation in which one line of a table corresponds to a plurality of lines of the other table and one line of the other table corresponds to a plurality of lines of the one table.

The above is the processing executed in step SB2 of the flowchart shown in FIG. 5. Thereafter, the process proceeds to step SB3 to perform a processing of automatically generating an objective variable candidate. The processing of automatically generating an objective variable candidate is a processing performed by the objective variable candidate generating unit 14 shown in FIG. 2, and is an objective variable candidate generating step. In the objective variable candidate generating step, first, the objective variable candidate generating unit 14 reads the result recognized by the type recognizing unit 13 shown in FIG. 2.

In step SB3*a* in the flowchart shown in FIG. 5, the objective variable candidate generating unit 14 sets at least one attribute that is a numeric type recognized by the type recognizing unit 13 as an attribute of an aggregation target, sets at least one attribute that is a category type recognized by the type recognizing unit 13 as an attribute of an aggregation unit, and aggregates, for each category value of the attribute of the aggregation unit, a numeric value of the attribute of the aggregation target based on a previously prepared aggregation function to automatically generate a new objective variable candidate. The objective variable is an attribute that the user of the data analyzing device 1 wants to predict. The aggregation function is a function applied for aggregating a plurality of attribute values of an attribute (purchase amount, etc.) of an aggregation target for an aggregation unit (gender, user, etc.), and a total (SUM), an average (AVE) and the like are generally used. However, other functions may also be used.

In addition, the objective variable candidate generating unit 14 may also be configured to set at least one attribute that is a numeric type recognized by the type recognizing unit 13 as an attribute of an aggregation target, set at least one attribute that is a numeric type recognized by the type recognizing unit 13 as an attribute of an aggregation unit, and aggregate, for each numeric value of the attribute of the aggregation unit, a numeric value of the attribute of the aggregation target based on a previously prepared aggregation function to automatically generate a new objective variable candidate.

Further, the objective variable candidate generating unit 14 may also be configured to set, regardless of the result of recognition by the type recognizing unit 13, at least one attribute as an attribute of an aggregation target, set at least one other attribute as an attribute of an aggregation unit, and aggregate, for each attribute value of the attribute of the aggregation unit, an attribute value of the attribute of the aggregation target based on a previously prepared aggregation function to automatically generate a new objective variable candidate. In this case, the type recognizing unit 13 can be omitted.

The objective variable candidate generating unit 14 will be described in detail below. The objective variable candidate newly generated by the objective variable candidate generating unit 14 is an objective variable candidate automatically generated based on a combination of the attributes included in the analysis target data and the aggregation function. Although the details will be described later, when there is a plurality of objective variable candidates, the user can select a desired one from these objective variable candidates and set the selected objective variable candidate as an objective variable.

The objective variable candidate generating unit 14 searches for objective variable candidates based on the table input to the data input unit 12 and the definition information of the relation between the tables, and stores the objective variable candidates in a candidate storing unit 30a shown in FIG. 2. The objective variable candidates can be roughly divided into four types: 1. an original attribute value; 2. a value obtained by converting an original attribute value into a flag; 3. a value obtained by aggregating an original attribute value per group of another attribute value; and 4. a value obtained by aggregating a table per group of another table. Each of them will be described below.

1. Original Attribute Value

Figure 9:
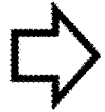
FIG. 9 is a diagram explaining a case where original attribute values are used as objective variable candidates.

As shown in FIG. 9, original attribute values are attributes included in the analysis target data input to the data input unit 12, and one of them can be treated as an objective variable candidate. Since it is necessary to provide an objective variable in a numeric value in machine learning, here only variables of numeric type will be the target.

2. Value Obtained by Converting Original Attribute Value into Flag

Figure 10:
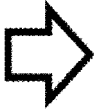
FIG. 10 is a diagram explaining a case where original attribute values are converted into flags.

The value obtained by converting an original attribute value into a flag is a value converted into binary information by applying a predetermined conditional expression to an original attribute included in the analysis target data input to the data input unit 12. The converted information can be set as the objective variable candidate. Regarding the method of applying the conditional expression, as shown in FIG. 10, when the type of an attribute value is a category type (for example, gender), conversion to binary information may be performed based on whether the value of the attribute matches a certain value. In this example, "male" is "1", and "female" is "0". In addition, regarding the method of applying the conditional expression, when the type of an attribute value is a numeric type (for example, age), conversion to binary information may be performed based on whether the value of the attribute is more than a certain value/less than a certain value/a certain value. In the case of a numeric value, a plurality of methods of setting thresholds can be considered, and statistics such as "average value" and "modal value" may be automatically selected as the thresholds. Also, the user may specify a random threshold. In this case, a threshold input unit may be provided. In addition, in the case of categorical variables, when there is a plurality of types of values, only high frequent values may be automatically selected.

3. Value Obtained by Aggregating Original Attribute Value Per Group of Another Attribute Value The value obtained by aggregating an original attribute value per group of another attribute value is a value obtained by grouping the values of the attributes of an aggregation target for each type of the other attributes and applying an aggregation function for each group. Combinations of the following four conditions a) to d) are tried exhaustively and are obtained as objective variable candidates.

| Condition | Possible value |
| --- | --- |
| a) Attribute of aggregation target | All attributes of numeric type |
| b) Attribute that is aggregation unit | All attributes of category type or attributes used for relation definition |
| c) Type of aggregation function | Predefined function set (for example, SUM, AVG) |
| d) Condition for aggregation (optional) | Automatically generated condition set (for example, weekly, monthly), or setting by user |

When a condition is specified for a table unrelated to a) and b), it will be ignored.

Figure 11:
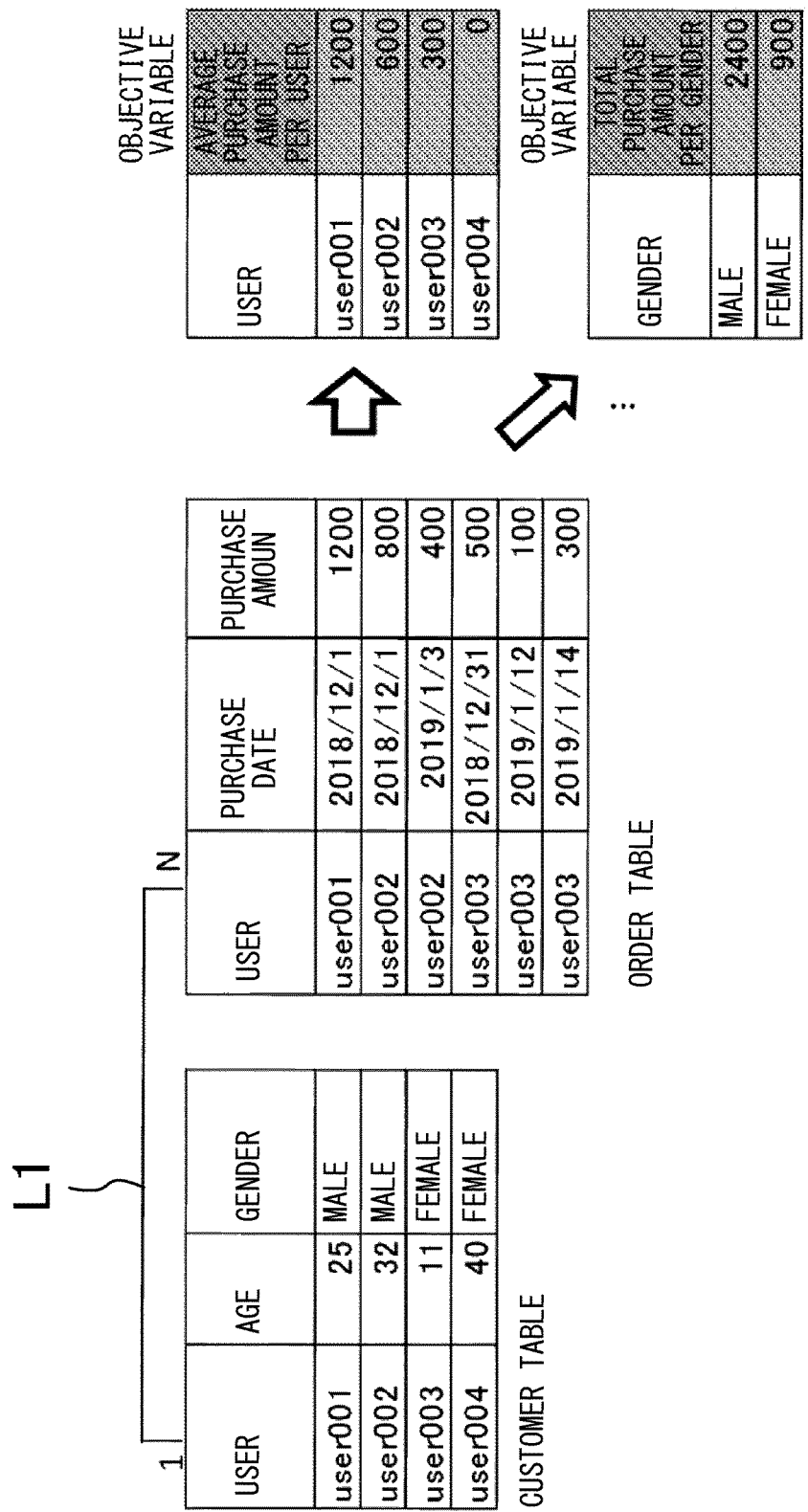
FIG. 11 is a diagram explaining a case where original attribute values are aggregated per group of other attribute values.

Taking the tables shown in FIG. 11 as an example, a line L1 connecting the attribute "user" of the customer table and the "user" of the order table indicates that the relation between the tables is defined in step SB2 in the flowchart shown in FIG. 5. Further, "1" and "N" at both ends of the line L1 represent multiplicity, and it is 1 when there is no repetition while it is N when there is repetition. In this case, "age" and "purchase amount" correspond to numeric type attributes and "user" and "gender" correspond to category type attributes, and these are recognized by the type recognizing unit 13.

For conditions of aggregation, for example, when there is a date type attribute (here, "purchase date") as a type of attribute values, a plurality of conditions such as the latest one month and the latest one week are automatically generated for the attribute. That is, the objective variable candidate generating unit 14 is configured to automatically generate a predetermined period as an aggregation condition when the analysis target data input to the data input unit 12 includes a date type attribute. The predetermined period may be set to any period, and can be set by, for example, year-month-date or time. Here, conditions may be automatically sorted out from actual attribute values. For example, when the actual attribute values are concentrated in a predetermined period, periods exceeding the predetermined period are excluded. To be specific, when the actual attribute values are concentrated in the range of two weeks, the condition "the latest one month" is excluded.

Here, when the aggregation function is of two types, SUM (total) and AVE (average) and the aggregation condition is of two types, "whole period" and "purchase date after 2019/1/1", as shown in FIG. 12, in all, 2×2×2×2=16 candidates are generated.

However, with regard to candidates 3 and 4 shown in FIG. 12, it is known from the multiplicity that there is always one type of the aggregation target (gender, age) with respect to the aggregation unit (user), and thus these candidates are deleted. Namely, it is possible to determine the number of types of the aggregation targets based on the multiplicity, and as a result of the determination, when the number of types of the aggregation targets is equal to or less than a predetermined number, to delete the candidates. Further, with regard to the candidates 9 to 12 shown in FIG. 12, the attributes of a) and b) are completed in the customer table and are not related to the conditional expression of d). Therefore, the candidates 9 to 12 are deleted. As a result, the remaining ten candidates (candidates 1, 2, 5 to 8, and 13 to 16) are added to the objective variable candidates.

Here, the aggregation unit b) is a single attribute. However, the objective variables may also be generated by aggregation by a plurality of combinations. In that case, for example, objective variables such as "purchase amount per prefecture×year" and "sales amount per store×month" may be defined.

In generating candidates of objective variables, the following SQL text is generated inside the data analyzing device 1.

SELECT SUM (GENDER) FROM ORDER TABLE WHERE PURCHASE DATE>='2019-01-01' GROUP BY USER;

In order to make it easy to understand when presenting to the user, by applying it to a template such as {aggregation function} of {condition} per {aggregation unit} {aggregation target}, an expression of natural language is also automatically generated. The natural language expression and the actual generation method (SQL) may be associated and stored in the storing unit 30.

4. Value Obtained by Aggregating Table Per Group of Another Table

In this case, aggregation is performed with respect to the table, not to the attribute. There are two types of aggregation methods, "the number of lines of a table" and "whether there is a line in a table", and aggregation is executable by obtaining the information.

| Condition | Possible value |
| --- | --- |
| a) Table of aggregation target | All tables |
| b) Attribute that is aggregation unit | All attributes of category type or attributes used for relation definition |
| c) Type of aggregation function | Predefined function set (for example, number of lines, presence/absence) |
| d) Condition for aggregation (optional) | Automatically generated condition set (for example, weekly, monthly), or setting by user |

Figure 13:
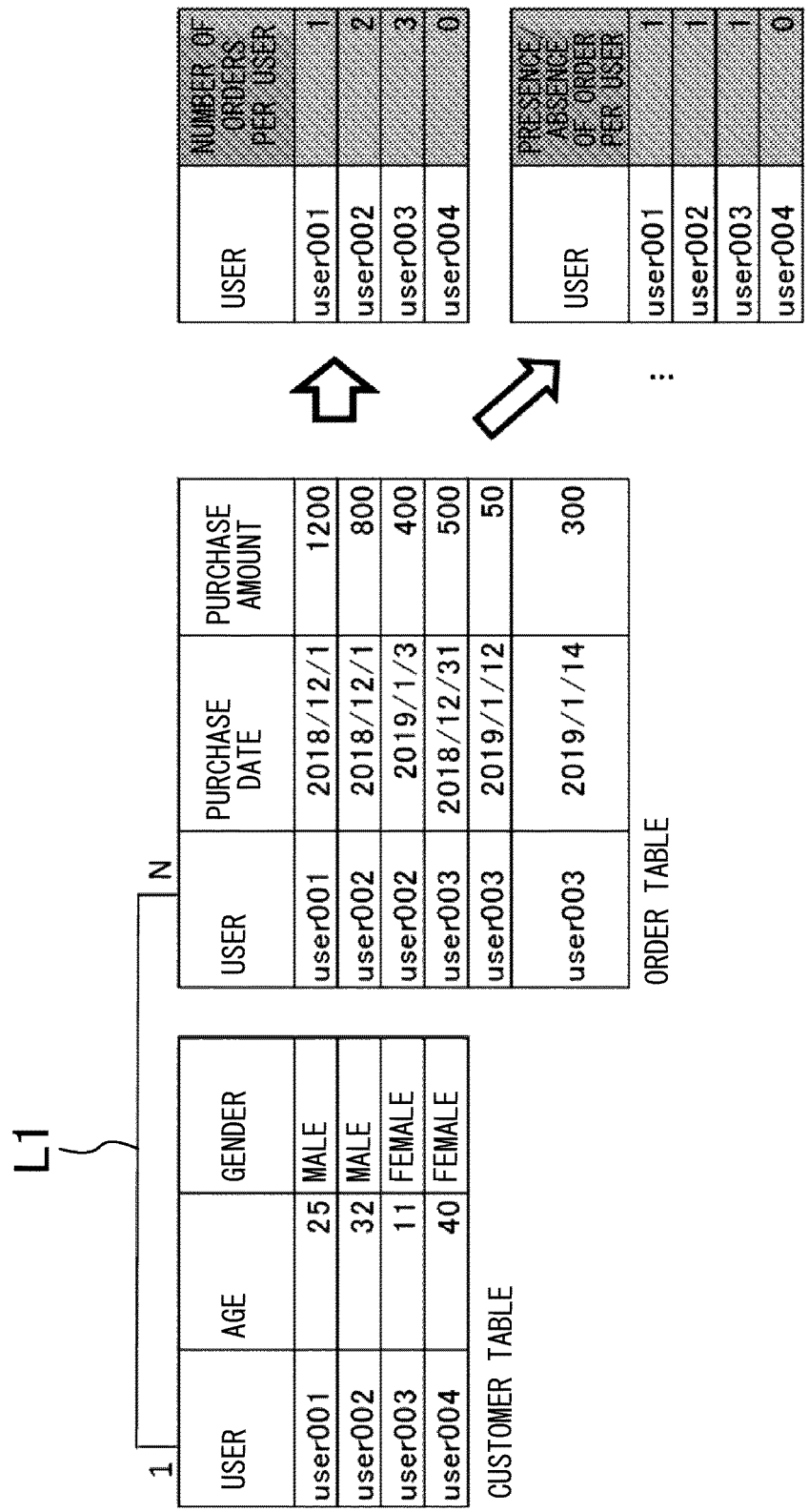
FIG. 13 is a diagram explaining a case where tables are aggregated per group of other tables.

Taking the table shown in FIG. 13 as an example, the line L1 connecting the attribute "user" of the customer table and the "user" of the order table is the same as that shown in FIG.

11. Similar to the above "3. Value obtained by aggregating original attribute value per group of another attribute value", candidates 1 to 8 shown in FIG. 14 remain when aggregations having a multiplicity of 1 are deleted. For example, the candidate 6 is an indicator of "customer defection" often used in marketing, and is useful in data analysis.

All applicable ones among the above 1 to 4 are applied to all attributes of all tables input by the user of the data analyzing device 1, and each of them is stored as an objective variable candidate in the candidate storing unit 30a shown in FIG. 2. In the aforementioned example, as shown in FIG. 15, 22 objective variable candidates are automatically generated.

The above is the processing executed in step SB3 in the flowchart shown in FIG. 5. Thereafter, the process proceeds to step SB4 and a feature value is automatically generated. This is a feature value automatic generating step. The generation of the feature value is substantially the same processing as the generation of the objective variable candidate, and may be performed together with the generation of the objective variable candidate in step SB3. In addition, although the generation of the feature value is performed by the feature value automatic generating unit 15 shown in FIG. 2, it may also be performed by the objective variable candidate generating unit 14.

The feature value automatic generating unit 15 is configured to automatically generate a new feature value by applying a predetermined function to the original attribute or a combination of a plurality of attributes included in the analysis target data. The feature value is synonymous with an explanatory candidate, and is an attribute used to describe an objective variable. Details of the automatic generation of a feature value will be described later.

In step SB5 in the flowchart shown in FIG. 5, scoring of an objective variable candidate is performed. The scoring of the objective variable candidate is to calculate a score representing, the usefulness of the objective variable candidate, and is performed by the score calculating unit 16 shown in FIG. 2.

In the above examples (examples shown in FIG. 11 and FIG. 13), each of the two tables (the customer table and the order table) has only three attributes. However, in actual analysis data, there are more data targets, and thus a large number of objective variable candidates are generated. For example, when there are 20 numeric type attributes and 20 category type attributes, and the aggregation period is of three types, "whole period", "one year", and "half a year", with the aggregation functions of "average", "total", "maximum", and "minimum", the objective variables obtained by aggregating the attributes will be 20×20×4×3=4800 types.

Accordingly, it is difficult for the user to obtain a desired objective variable only by presenting all the generated objective variable candidates. Therefore, in step SB5 in the flowchart shown in FIG. 5, a score indicating the usefulness for the user is calculated for the objective variable candidate generated in step SB3. For example, by presenting the score values in descending order to the user or presenting only the score values that are equal to or greater than a predetermined value, the user can quickly start a desired analysis.

As a method of score calculation, for example, the following indicators 1 to 7 or any combination of these indicators may be used. However, the method is not limited thereto.

1. Number of Lines of Generated Objective Variables

The score calculating unit 16 may be configured to calculate the score based on the number of lines of the generated objective variables. That is, that how many lines of objective variables are generated differs by objective variable candidates. For example, in the example shown in FIG. 15, in the case of "total purchase amount per gender", only two lines (male and female) of objective variables are generated. In a case of performing data analysis by supervised learning, it is generally known that accurate analysis cannot be performed when the number of data is too small. For this reason, in the case where only two lines of data are generated as described above, it is expected that no meaningful results will be obtained even if an analysis is conducted. Therefore, usefulness can be expressed by scoring the number of lines of the generated objective variables. That is, the smaller the number of lines of the generated objective variables, the lower the score is; the greater the number of lines of the generated objective variables, the higher the score is.

2. Variance of Generated Objective Variables

The score calculating unit 16 may be configured to calculate a score based on a variance of the generated objective variables. That is, in the case of performing data analysis by supervised learning, when all the values of the objective variables become the same value, it is impossible to make a meaningful calculation. This is because the optimal solution is to always output a constant while ignoring all the values of the explanatory variables. Therefore, the variance of the generated objective variables is reflected in the score, thereby lowering the score of such a case. In a word, the smaller the variance, the lower the score.

3. Whether Attribute Used for Defining Relation Between Tables is Aggregation Unit or not The score calculating unit 16 may be configured to calculate a score based on an attribute used for defining a relation between tables. That is, in a case of creating objective variables by aggregating per attribute, either of 1) a categorical variable and 2) an attribute used for relation definition may be used as the aggregation unit. In general, attributes used for defining the relation between tables often have important grading in business, such as "user" and "item". Therefore, the attribute used for defining the relation between tables is obtained and a higher score is given to the objective variable using the attribute used for relation definition.

4. Number of Records in Each Group

The score calculating unit 16 may be configured to calculate a score based on the number of records (number of data) in a group. That is, in the generation of objective variable candidates, cases where there is only one record in each group, such as "average age per user", is excluded. Even if it is not a self-evident case like this, when the number of records in the group is small, it is often not useful even calculating the average value. Therefore, for an objective variable using an average value, the number of records in each group is also taken into account to calculate the score. The greater the number of records, the higher the score is; the smaller the number of records, the lower the score is. In this case, record number acquiring means for acquiring the number of records may be provided.

5. Similarity to Objective Variables that have been Selected in the Past

The score calculating unit 16 may be configured to calculate a score based on the degree of similarity to objective variables that have been selected in the past. That is, it is presumed that the objective variables that have been used by the user are very likely to be used again. Therefore, for example, the following score criteria may be used. In this case, an objective variable that has been used in the past is stored in the storing unit 30 shown in FIG. 2, and when calculating the score, it is only necessary to read the objective variable that has been used in the past from the storing unit 30.

Score=1: If it matches any one of the objective variables that have been used in the latest N times Score=0: else Alternatively, the number of times of being used for objective variables among the latest N times may be defined as the latest adoption rate and it may be combined with the adoption rate for each component of the objective variables.

Score=latest adoption rate of aggregation target× latest adoption rate of aggregation unit×latest adoption rate of aggregation function When the data analyzing device 1 is provided as a system available to a plurality of users, it is possible to give a high score to an objective variable adopted by another user in the same data. For example, it is only necessary to associate a user and an objective variable adopted by the user and store in the storing unit 30 shown in FIG. 2, and to read the information from the storing unit 30 when calculating the score. In this case, it is possible to use a machine learning method known as a general recommendation algorithm such as collaborative filtering.

6. Name of Attribute

The score calculating unit 16 may be configured to calculate a score based on the name of an attribute. That is, a score is added when the name of the attribute includes characters having meanings that are easy to be used for objective variables in data analysis, such as "unit price", "sales", "defective products", and "defection". As to how many scores should be added for what kind of name, it may be done by collating a correspondence table generated in advance on the system side, or machine learning may be used to directly calculate the score from the name of the attribute.

7. Percentage of Missing Values

The score calculating unit 16 may be configured to calculate a score based on the percentage of missing values. In the case of calculating an average value, the value of the objective variable cannot be defined when there are no records to be aggregated in a target group. Such a case is called missing values, and it is necessary to fill in with appropriate values, such as 0, for each problem, or exclude missing lines from the analysis. When the percentage of missing values is high, the reliability of the analysis decreases. Therefore, the score is lowered as the number of missing values increases.

Score=100−percentage of missing values in objective variable (%)

The above is the processing executed in step SB5 in the flowchart shown in FIG. 5. Then, the process proceeds to step SB6 to refine the objective variables. The refining of the objective variables means that a user refines the desired objective variables from the plurality of objective variable candidates generated in step SB3, and this may be performed by the keyword input unit 18 and the attribute selecting unit 19 shown in FIG. 2. The keyword input unit 18 generates a user interface for keyword input 54 shown in FIGS. 16A and 16B to display on the monitor 3 and receives the user's operation performed on the user interface for keyword input 54. This is a keyword input step.

Figure 16A:
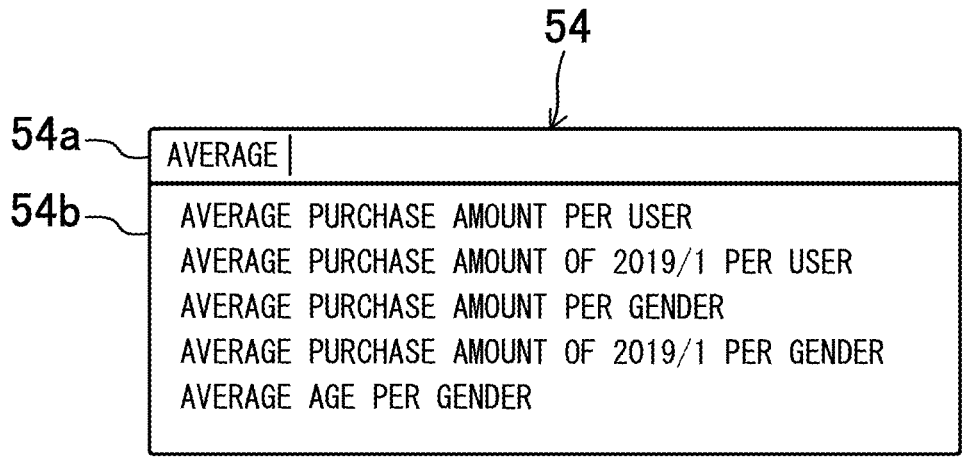
FIG. 16A is a user interface for keyword input showing a case where one keyword is input.
Figure 16B:
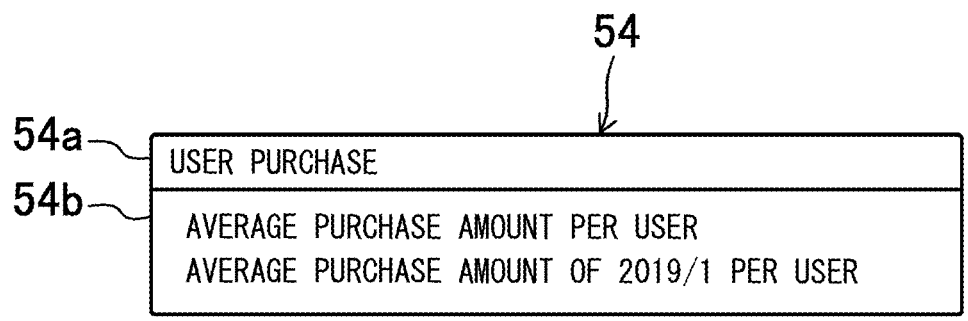
FIG. 16B is a user interface for keyword input showing a case where two keywords are input.

The user interface for keyword input 54 is provided with an input region 54a where the user can input a text such as a search keyword, and a candidate display region 54b. Information input to the input region 54a is keyword information, and may be keyword information containing one word as shown in FIG. 16A, or may be keyword information containing two or more words as shown in FIG. 16B. It is possible to input a plurality of pieces of keyword information.

The input region 54a is configured to receive a text input from the user, that is, an input of keyword information. When the text input is received, the objective variable candidate generating unit 14 searches a natural language expression of the objective variable candidate that matches the input from among the plurality of objective variable candidates generated in step SB3 in the flowchart shown in FIG. 5. The objective variable candidate generating unit 14 is configured to generate in advance a list of objective variable candidates and extract objective variable candidates related to the keyword information input by the user via the keyword input unit 18 from the list.

Specific examples will be described based on FIGS. 16A and 16B. In the example shown in FIG. 16A, one word is input, and thus objective variables containing the word are searched. In the example shown in FIG. 16B, two words are input, and thus objective variables containing the two words are searched. In the search, a fuzzy match search (for example, purchase price and purchase amount) based on word similarity and the like may be performed for an input that does not completely match the objective variable candidates. In addition, it may be configured to be capable of selecting between AND search and OR search.

In the candidate display region 54b, objective variable candidates including the text input by the user are displayed as a search result. Since this is displayed on the monitor 3, the monitor 3 displays new objective variable candidates generated by the objective variable candidate generating unit 14 and also displays objective variable candidates (objective variable candidates extracted from the list) related to the keyword information input by the user via the keyword input unit 18. In this way, the display step is executed. When it is not necessary to refine the objective variables, the new objective variable candidates generated by the objective variable candidate generating unit 14 may be displayed on the monitor 3 without performing a text search. The new objective variable candidates generated are displayed on the monitor 3, and thus the user can easily grasp the objective variable candidates.

In the candidate display region 54b, the objective variable candidates are displayed in descending order of scores calculated by the score calculating unit 16. The objective variable candidates may be arranged and displayed in a ranking format where the higher the score, the higher the objective variable candidate ranks. As a result of the search, when there are many objective variable candidates, only the objective variable candidates having the scores ranking high among the scores calculated by the score calculating unit 16 may be displayed in the candidate display region 54b. In this case, the number of displayable objective variable candidates can be set to about five or ten. In a word, the monitor 3 may be configured to be capable of displaying an objective variable candidate having a score calculated by the score calculating unit 16 equal to or greater than a predetermined value, and in this case, the number of the displayed objective variable candidates may be set as a predetermined number.

The monitor 3 can simultaneously display the original attribute of the analysis target data input to the data input unit 12 and the new objective variable candidate generated by the objective variable candidate generating unit 14. The monitor 3 can also be configured to display a value obtained by converting the attribute value of the original attribute of the analysis target data input to the data input unit 12 into a flag.

Figure 17:
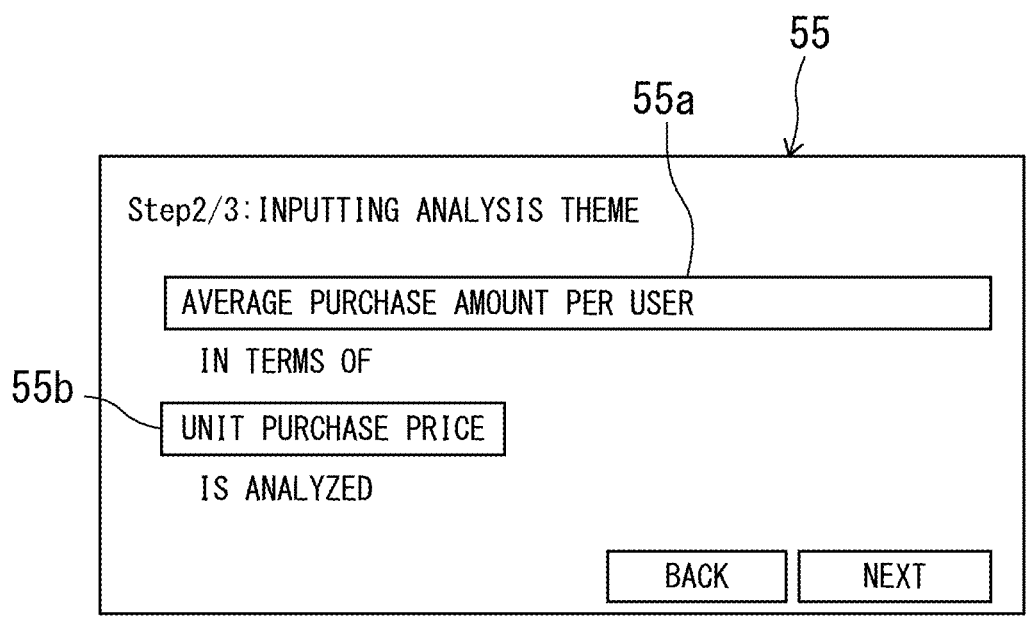
FIG. 17 is a diagram showing a user interface for editing.

In addition, means for allowing the user to edit a column name of the generated objective variables may be provided. That is, the keyword input unit 18 generates a user interface for editing 55 shown in FIG. 17 to display on the monitor 3 and receives the user's operation performed on the user interface for editing 55. The user interface for editing 55 is provided with an editing target input region 55a to input a column name of an objective variable to be edited, and a column name input region 55b to input a changed column name. When "average purchase amount per user" is input in the editing target input region 55a and "unit purchase price" is input in the column name input region 55b, the column name of the objective variable is changed to "unit purchase price". This makes it easier to understand the results of data analysis.

The attribute selecting unit 19 shown in FIG. 2 is a part that receives a selection input from the user regarding an attribute of an aggregation target or an aggregation unit, and is, similar to the keyword input unit 18, configured to be capable of selecting and inputting an attribute. In this case, an objective target candidate generated by using the attribute input by the user via the attribute selecting unit 19 as an aggregation target or an aggregation unit is displayed on the monitor 3.

Either of the generation of the objective variable candidate by the objective variable candidate generating unit 14 and the reception of the input from the user regarding the attribute of the aggregation target or the aggregation unit may be first. When the input from the user regarding the attribute of the aggregation target or the aggregation unit is received after the generation of the objective variable candidate by the objective variable candidate generating unit 14, it is possible to extract from the generated objective variable candidates the objective variable candidate generated using the attribute input by the user as the aggregation target or the aggregation unit to display on the display unit. When the input from the user regarding the attribute of the aggregation target or the aggregation unit is received before the generation of the objective variable candidate by the objective variable candidate generating unit 14, it is only necessary that the objective variable candidate generating unit 14 generates an objective variable candidate using the attribute input by the user as the aggregation target or the aggregation unit and the generated objective variable candidate is displayed on the display unit.

The selection receiving unit 20 shown in FIG. 2 is a part that receives a selection of an objective variable by the user from among the objective variable candidates displayed on the monitor 3, and the selection receiving step is executed thereby. Specifically, it is configured to be capable of detecting which one is selected by the user from the objective variable candidates displayed in the candidate display region 54b of the user interface for keyword input 54 shown in FIGS. 16A and 16B. For example, by arranging the pointer of the mouse 5 so as to overlap with one of the objective variable candidates displayed in the candidate display region 54b and clicking, the objective variable can be selected, and an objective variable may also be selected by operating the keyboard 4 and the like. The selection receiving unit 20 can also be configured to be capable of selecting a plurality of objective variables.

When the original attribute and the new objective variable candidate are displayed on the monitor 3, the selection receiving unit 20 can receive a selection of an objective variable by the user from the original attribute and the new objective variable candidate. When the original attribute, the new objective variable candidate, and the value converted into a flag are displayed on the monitor 3, the selection receiving unit 20 can receive a selection of an objective variable by the user from the original attribute, the new objective variable candidate, and the value converted into a flag. The candidate display region 54b may display a plurality of objective variable candidates, and may also display only one objective variable candidate. However, in either case, it is configured to receive the selection of the objective variable by the user.

Figure 18:
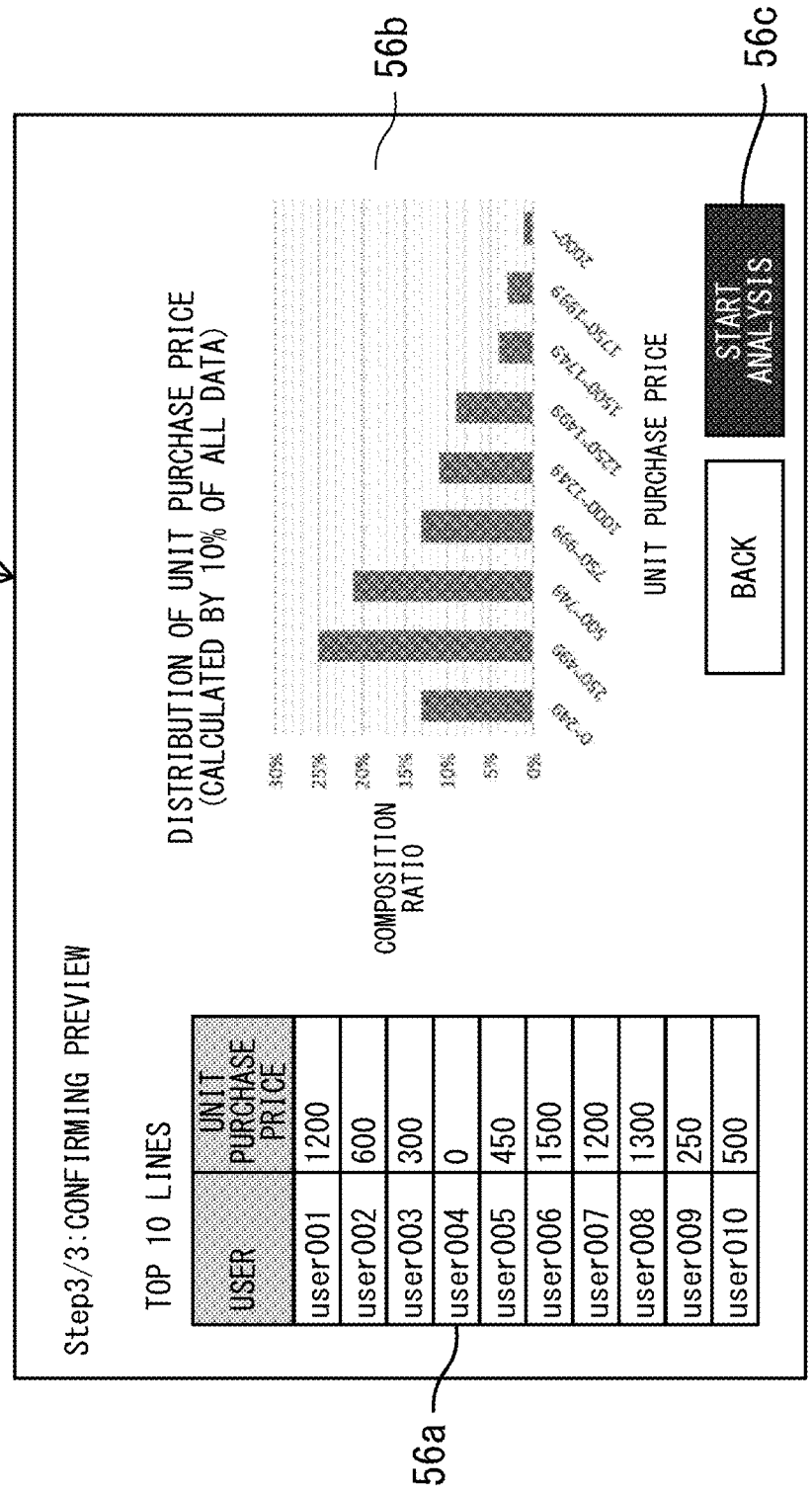
FIG. 18 is a diagram showing a user interface of preview display.

The above is the processing executed in step SB6 in the flowchart shown in FIG. 5. Thereafter, the process proceeds to step SB7 to perform preview display. In the preview display, for the objective variable selected by the user in step SB6, the objective variable is actually calculated using the analysis target data and the result is displayed as preview. The control unit 10 generates, for example, a user interface for preview display 56 shown in FIG. 18 to display on the monitor 3. The user interface for preview display 56 is provided with an objective variable display region 56a which displays the objective variable selected by the user, a preview display region 56b which displays the result of the actually performed calculation of the objective variable, and an analysis start button 56c. The result displayed in the preview display region 56b may be a calculation result using only a part of data (10% of all data in the present example) when the data amount is large. The amount of data used for the calculation may be displayed in the user interface for preview display 56 so that it can be known by the user.

By the processing of step SB6, it is possible to display only a part of the analysis results on the monitor 3 as preview display before the generation of a prediction model by the analyzing unit 21. By preview display, it is possible to confirm before analysis execution whether this is the user's intended analysis content.

When it is the user's intended analysis content, the user presses the analysis start button 56c of the user interface for preview display 56. As a result, the process proceeds to step SB8 in the flowchart shown in FIG. 5. When it is not the user's intended analysis content, the process can return to step SB6 and another objective variable candidate can be selected.

In step SB8, the objective variable selected by the selection receiving unit 20 is used to perform an actual data analysis using a prediction model. A known machine learning method (for example, AutoWEKA, etc.) may be used to select an optimal one from a plurality of prediction models. This is an analyzing step performed by the analyzing unit 21 shown in FIG. 2. The analyzing unit 21 is configured to be capable of generating a prediction model for predicting the objective variable selected by the selection receiving unit 20 using the new feature value generated by the feature value automatic generating unit 15. For example, it is possible to generate a prediction model for predicting an objective variable from a plurality of feature values, and this prediction model can be created by, for example, multiple regression analysis or a decision tree. There are various generation methods, and any of the methods that are conventionally known may be used.

(Automatic Generation of Feature Value)

For example, in a case where the objective variable is "sum of purchase amount per user", when the "sum of purchase amount per user" is also created in the feature value, an analysis result in which all other feature values are ignored is obtained and it is not possible to obtain a meaningful analysis result. Such a situation in which the information of the objective variable is unintentionally "leaked" to the feature value is called a leak, and this tends to happen on analysts who are not skilled in machine learning.

In order to prevent the leak, the feature value automatic generating unit 15 is configured to automatically generate a new feature value by applying a predetermined function to attributes excluding at least a part of attribute values of attributes of the aggregation target used by the objective variable candidate generating unit 14 when generating an objective variable selected by the selection receiving unit 20. Therefore, when the user selects an objective variable, a new feature value is automatically generated. In this case, a predetermined function is applied to attributes excluding at least a part of attribute values of attributes of the aggregation target used when generating an objective variable by the objective variable candidate generating unit 14, and thus a situation in which the information of the objective variable is unintentionally leaked to the feature value is avoided.

The feature value automatic generating unit 15 may also be configured to automatically generate a new feature value by applying a predetermined function to the original attribute or a combination of a plurality of attributes included in the analysis target data, and exclude from the generated feature values the feature value including information of at least a part of attribute values of attributes of the aggregation target used for the objective variable selected by the selection receiving unit 20 to generate a final feature value. In this case, a feature value including the information of at least a part of attribute values of attributes of the aggregation target used for the objective variable is excluded to obtain the final feature value, and thus a situation in which the information of the objective variable is unintentionally leaked to the feature value is avoided. Therefore, the situation in which the information of the objective variable is unintentionally leaked to the feature value (leak) can be automatically prevented even for those who are not skilled in machine learning.

Configurations that can be provided in the data analyzing device 1 as means for preventing a leak will be described in detail below.

1. Use Only Data Prior to a Period Used to Aggregate Objective Variables

Figure 19:
FIG. 19 is a diagram showing an example in which feature values are generated using only data prior to a period used for totaling objective variables.

In step SB3 in the flowchart shown in FIG. 5, when the aggregation condition of the objective variables is set by date, the analysis target data prior to the date is not used for the objective variables, and thus no leaks occur even if it is used for calculating the feature value. Therefore, it is determined whether a date is specified in the aggregation condition. When a date is specified, it is made such that the period as the aggregation condition of the objective variables does not overlap with the period of the analysis target data used for calculating the feature value, and only the analysis target data prior to the date of the aggregation condition at the time of the generation of the feature value is used. Accordingly, as shown in FIG. 19, for example, when "average purchase amount of 2019/1 per user" is set as the objective variable, "average purchase amount of 2018/12 per user" prior to "average purchase amount of 2019/1 per user" can be generated as the feature value. Namely, the feature value automatic generating unit 15 may be configured to automatically generate a feature value by excluding attribute values in the corresponding period of the aggregation target when the aggregation condition of the objective variables is set by date, and to be specific, a feature value is automatically generated by using only the analysis target data prior to that date.

2. Do not Use Attributes/Tables which are Aggregation Targets of Objective Variables for the Feature Value The feature value automatic generating unit 15 may be configured to determine whether a date is specified in the aggregation condition of objective variables and, when a date is not specified, to exclude the attribute itself used for the objective variables from the generation target of the feature value. The aforementioned method 1 cannot be used when a date is not specified in the aggregation condition of the objective variables. In that case, the attribute itself used for the objective variables is excluded from the generation target of the feature value. In this way, the situation in which the information of the objective variable is unintentionally leaked to the feature value is avoided. In this case, it is only necessary to make the attribute used for the objective variable read from the storing unit 30 and the like.

Next, an improvement of interpretativeness will be described. The aggregation period of the analysis target data used in the generation of the objective variable candidate by the objective variable candidate generating unit 14 and the aggregation period of the analysis target data used in the generation of the feature value by the feature value automatic generating unit 15 can be matched. For example, when the objective variable is "total sales per store of 2019/1", it can be inferred that the user of the data analyzing device 1 is interested in the aggregation on a monthly basis. As a result, it is also inferred for the feature value that it is effective to add the feature value aggregated in one month, such as "total sales per store of 2018/12 (previous month)" and "total sales per store of 2018/1 (same month in previous year)", and thus a feature value aggregated in such a period is generated. Similarly, when "total sales of 2019/1/1 to 1/8" is the objective variable, a feature value aggregated on a weekly basis is automatically generated. It takes time to try the period of aggregation in a round-robin format. In contrast, by generating a feature value in accordance with the time unit instructed by the user, it is possible to quickly obtain a result which is easier to interpret for the user.

The feature value automatic generating unit 15 can automatically generate a plurality of feature values by variously changing the combination of the aggregation target, the aggregation unit, the aggregation function, and the aggregation conditions the same as the objective variables (for example, see "A Randomized Exhaustive Propositionalization Approach for Molecule Classification" (May 26, 2010)). In this case, as described above, it is possible to perform data analysis in which the leak is avoided by excluding the attribute used by the objective variable candidate generating unit 14. However, even with other criteria, it is possible in cases to improve the accuracy of the prediction model, analysis time, memory usage, and interpretativeness of results by excluding a part of feature values based on various criteria.

For example, when a plurality of feature values is automatically generated, a part of the feature values may tend to be similar to one another. The feature values that make the aggregation target and the aggregation unit the same, for example, "average purchase price per customer" and "median purchase price per customer", may have a very high correlation. It is generally known that when feature values having a very high correlation value are used for data analysis, the analysis result becomes unstable and the interpretativeness of the result is impaired due to a characteristic called multicollinearity. Therefore, at the feature value automatic generating unit 15, the feature values having a part (for example, the aggregation target and the aggregation unit) of the aggregation target, the aggregation unit, the aggregation function, and the aggregation conditions in common may be regarded as one group, and a part of the feature values may be excluded so that only one feature value remains in the group. As to how to determine the feature value to be left, a known algorithm calculating the importance of the feature value, for example, the correlation coefficient with the objective variable, the magnitude of the coefficient in multiple regression analysis, information gain in decision tree analysis, etc., may be used. Alternatively, similar to the case of the objective variables, a score composed of a plurality of viewpoints may be calculated, and the feature value may be selected based on the magnitude of the score. In addition, the definition of the group may be explicitly given by the user.

Figure 20:
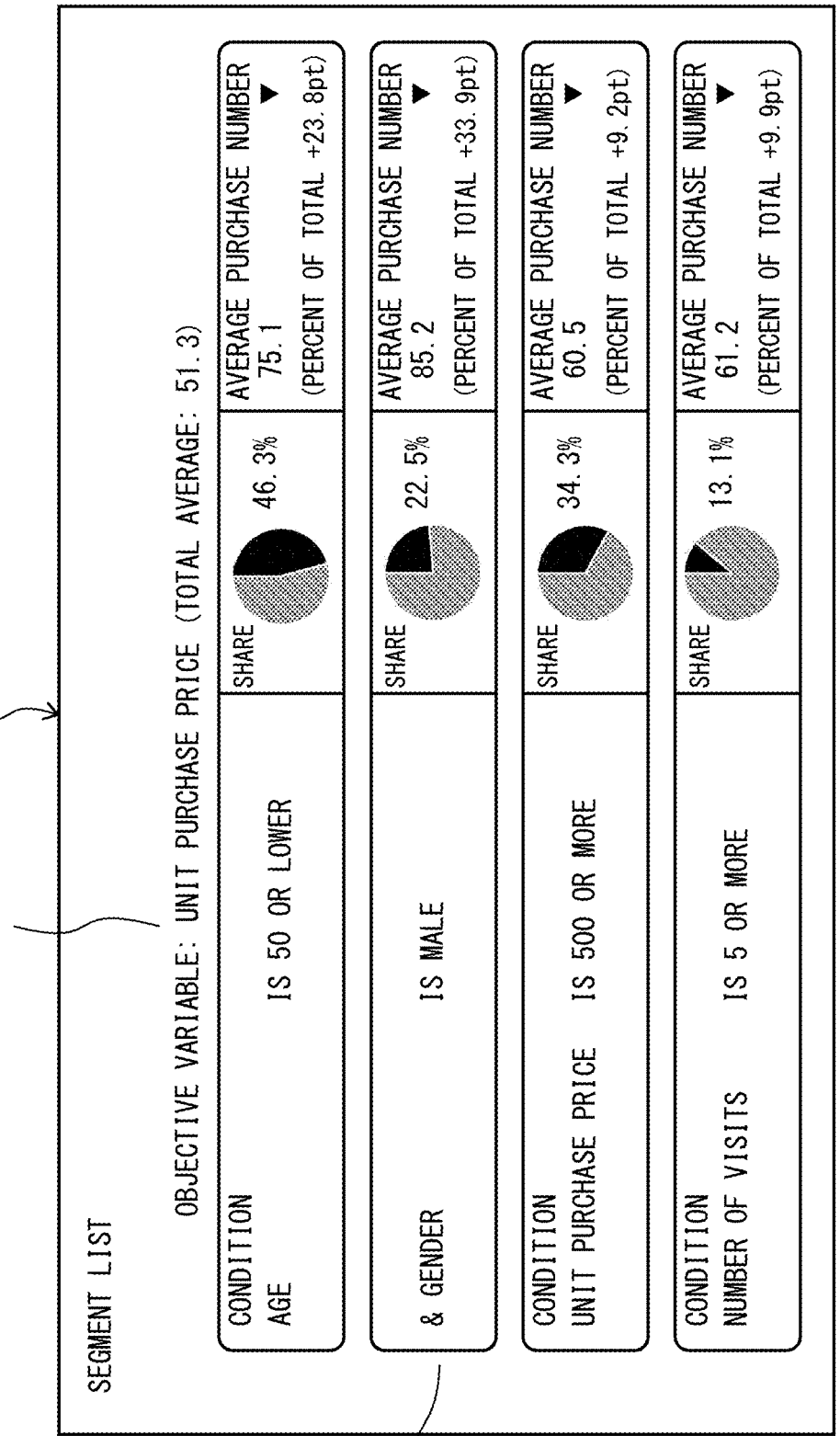
FIG. 20 is a diagram showing a user interface for result display.

FIG. 20 shows a user interface for result display 57. The user interface for result display 57 is generated by the control unit 10 and displayed on the monitor 3. The user interface for result display 57 is provided with an objective variable display region 57a to display an objective variable, and a segment display region 57b to display a segment. The segment is a subset of data extracted by applying a line extraction condition to analysis target data, and can also be called a combination of an attribute and the condition.

Alternative Mode of Objective Variable Refining Method

Figure 21A:
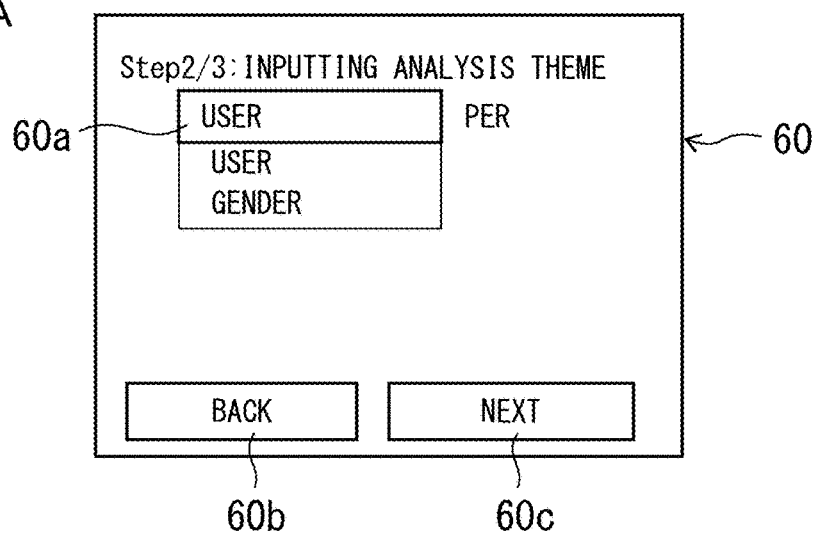
FIG. 21A is a diagram showing a user interface for refining, which shows a state of receiving a selection of attributes.

In step SB6 in the flowchart shown in FIG. 5, the objective variable candidates generated in step SB3 are refined. However, the method is not limited to the above-described method, and the following method may also be used. That is, it may be configured to be capable of receiving a stepwise selection in refining the objective variables. In a first stage, as shown in FIG. 21A, the selection of the attribute which is the aggregation unit for the objective variables is received. Options presented here are attributes selected as aggregation units for at least one of all of the objective variable candidates generated in step SB3. FIG. 21A shows a user interface for refining 60, and the control unit 10 generates the user interface for refining 60 to display on the monitor 3. The user interface for refining 60 is provided with an attribute selecting unit 60a with a pull-down menu form to receive the selection of the attribute which is the aggregation unit, a BACK button 60b, and a NEXT button 60c. After selecting the attribute by the attribute selecting unit 60a, the process proceeds to a second stage by pressing the NEXT button 60c.

Figure 21B:
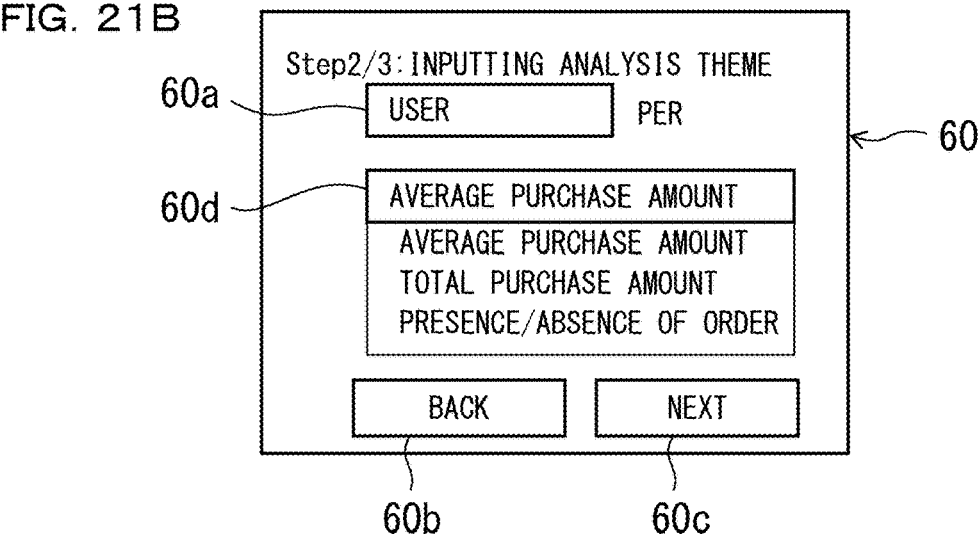
FIG. 21B is a diagram showing a user interface for refining, which shows a state in which selected objective variables are displayed in order of scores.

In the second stage, as shown in FIG. 21B, among all objective variable candidates, only objective variables that have the attribute selected in the first stage as the aggregation unit are presented in an order of score. This is displayed in a score order display region 60d provided in the user interface for refining 60. A selecting unit with a pull-down menu form which receives the selection of the objective variable is provided in the score order display region 60d and can receive the selection of the objective variable. As a result, it is possible to quickly select an objective variable that matches the grading that the user wants to analyze from a plurality of objective variable candidates. After selecting the objective variable, the process proceeds to a third stage by pressing the NEXT button 60c.

Figure 21C:
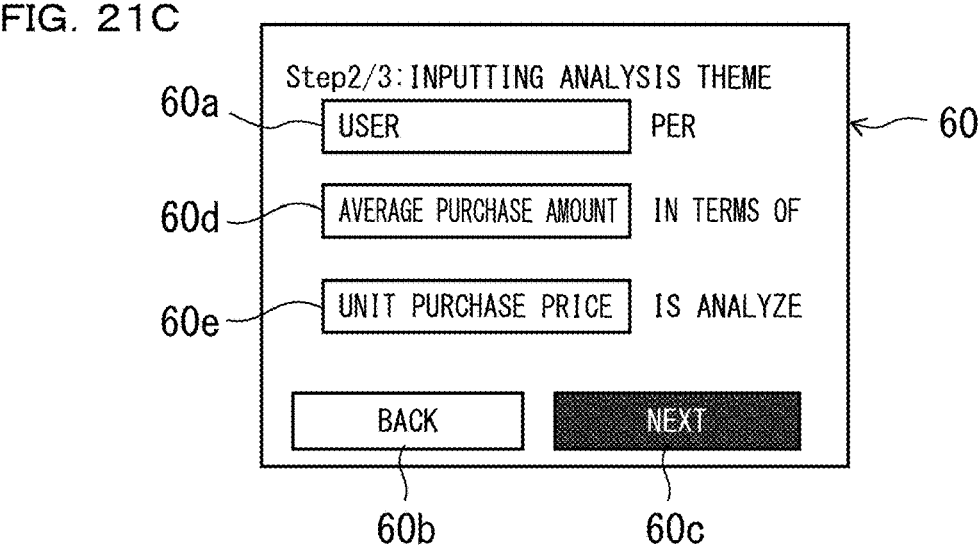
FIG. 21C is a diagram showing a user interface for refining, which shows a state in which an alias is specified for an objective variable.

In the final third stage, specification of an alias for displaying the analysis result in an easy-to-understand manner is received for the selected objective variable. As shown in FIG. 21C, the user interface for refining 60 is provided with an alias specification region 60e in which an alias can be input. When the user inputs an alias in the alias specification region 60e, the name of the objective variable selected in the second stage is changed to the input alias.

In this example, first the candidates for all aggregation units are generated in step SB3 and then the selection by the user is received in step SB6. However, this order may be reversed. That is, it is also possible to first receive the selection of the aggregation unit by the user and then to generate only the objective variables that use the attribute as the aggregation unit to present these objective variables in a list to the user. In this way, the number of the generated objective variable candidates can be reduced. Although the selection of the attribute used as the aggregation unit is received here, it is also fine to receive the attribute of the aggregation target instead.

EXAMPLES

Three kinds of examples will be described below regarding a method of holding internal data in each step of the generation processing of the objective variable.

First Example

In the first example, as shown in "1. Input data" in FIG. 22, it is assumed that the user inputs two tables, a customer table and an order table, as analysis target data. The objective variable candidate generating unit 14 generates new attributes combining the attributes based on the input tables (analysis target data) and generates the same as objective variable candidates. In this case, as shown in "2. Generation of objective variable candidate" in FIG. 22, new tables including the objective variables and the aggregation units are generated in the data analyzing device 1.

Next, as shown in "3. Selection of objective variable" in FIG. 22, one table including the objective variable selected by the user is selected from the created new tables. In this example, "average purchase amount per user" generated by the combination of:

attribute of aggregation target: purchase amount (order table), aggregation unit: user (order table), and aggregation function: average is selected.

In the subsequent feature value automatic generating step, new attributes are generated as feature values from the combination of the aggregation function and the attributes based on the three remaining tables in "3. Selection of objective variable". In this step, as shown in "4. Generation of feature value", "purchase amount", which is the attribute of the aggregation target in the objective variables, is excluded from the generation targets of the feature values.

Second Example

In the second example, the user can update the customer table and the order table to the latest state after selecting the objective variable. That is, before an actual data analysis (feature generation to prediction modeling) is started, the value of the attribute of the objective variable is recalculated based on the latest state and data analysis is performed based on the recalculated value. By recalculating for different analysis target data, it is possible to utilize the selected objective variable when performing repeated analysis, such as when performing fixed analysis processing monthly.

"1. Input data", "2. Generation of objective variable candidate", and "3. Selection of objective variable" in FIG. 23 are the same as the respective steps in FIG. 22. In the second example, there is a step of "4. Update of analysis target data", in which the lightly shaded cells are places updated from the step of "3. Selection of objective variable".

Third Example

In the third example, when generating objective variable candidates, instead of generating actual attributes and attribute values, as shown in the step of "2. Generation of objective variable candidate" in FIG. 24, combinations of aggregation target and aggregation unit and aggregation function, corresponding natural language expressions, and SQL texts are stored. This can be stored in the storing unit 30 shown in FIG. 2.

Then, as shown in "3. Selection of objective variable" in FIG. 24, when an objective variable is selected according to the specification of the user, the aforementioned SQL text is applied to the actual data, and as shown in "4. Execution of SQL", a table including the objective variable is generated. Similar to the second example, the attribute values of the target tables may be updated before actually applying the SQL text. As a result, by holding only the combination method without generating the attribute value of the objective variable in the step of "2. Generation of objective variable candidate", it is possible to reduce the amount of data to be generated and to speed up processing.

Effect of Embodiment(s)

As described above, according to the data analyzing device 1 according to the embodiment, it is possible to set at least one attribute that is a numeric type as an attribute of an aggregation target, set at least one attribute that is a category type as an attribute of an aggregation unit, and aggregate, for each category value of the attribute of the aggregation unit, a numeric value of the attribute of the aggregation target based on a previously prepared aggregation function to automatically generate and display a new objective variable candidate. Further, it is possible to receive a selection of an objective variable by a user from among the displayed objective variable candidates and to automatically generate a prediction model for predicting the selected objective variable, and thus even those who are unskilled in data processing can conduct an analysis freely.

Further, a predetermined function is applied to attributes excluding at least a part of attribute values of attributes of the aggregation target used when generating an objective variable, and thus a situation in which the information of the objective variable is unintentionally leaked to the feature value is avoided. Therefore, leaks can be automatically prevented even for those who are not skilled in machine learning.

Moreover, a feature value including the information of at least a part of attribute values of attributes of the aggregation target used for the objective variable is excluded to obtain the final feature value, and thus a situation in which the information of the objective variable is unintentionally leaked to the feature value is avoided. Therefore, leaks can be automatically prevented even for those who are not skilled in machine learning.

In addition, the objective variable candidate can be automatically generated by the objective variable candidate generating unit 14, and the objective variable candidate can be extracted based on the keyword information and the attribute and displayed on the monitor 3. This makes it easy for the user to select the objective variable candidate.

The embodiments described above are merely illustrative in all respects and should not be interpreted limitedly.

Furthermore, all variations and modifications that fall within equivalent scopes of the claims fall within the scope of the invention.

As described above, the data analyzing device according to the invention can be used in cases of attempting to obtain useful knowledge that has been unknown from among a large amount of information.

What is claimed is:

1. A data analyzing device which receives an input of tables of analysis target data including a plurality of attributes, defines a relation between the tables by specifying one attribute respectively for the tables, receives a selection of an objective variable being predicted, and generates a prediction model for predicting the objective variable using at least one attribute of the tables, the device comprising a processor in communication with a memory, the processor being configured to execute instructions stored in the memory that cause the processor to:

recognize whether a type of an attribute value of each attribute of the analysis target data is a numeric type indicating that it is a numeric value or a category type indicating that it is a category, set at least one attribute of an aggregation unit that is used to define the relation between the tables, the attribute of the aggregation unit being recognized as the category type, set at least one attribute of an aggregation target, the attribute of the aggregation target being recognized as the numeric type aggregate, for each category value of the attribute of the aggregation unit, a numeric value of the attribute of the aggregation target based on a previously prepared aggregation function to generate a plurality of new objective variable candidates, the plurality of new objective variable candidates not being included in the attributes of the tables and being generated by using the attribute of the aggregation unit that is used to define the relation between the tables, display the plurality of new objective variable candidates, receive a selection of one new objective variable by a user from among the plurality of displayed new objective variable candidates, and generate a new prediction model for predicting the selected new objective variable.

2. The data analyzing device according to claim 1, wherein the processor is further caused to display an original attribute of the analysis target data and the plurality of new objective variable candidates, and receive a selection of an objective variable by a user from the original attribute and the plurality of new objective variable candidates that are displayed.

3. The data analyzing device according to claim 2, wherein the processor is further caused to display a value obtained by converting an attribute value of an original attribute of the analysis target data into a flag, and receive a selection of an objective variable by a user from the original attribute, the plurality of new objective variable candidates, and the value converted into the flag that are displayed.

4. The data analyzing device according to claim 1, wherein the processor is further caused to set at least one attribute that is a numeric type recognized as an attribute of an aggregation target, set at least one attribute that is a numeric type recognized as an attribute of an aggregation unit, and aggregate, for each numeric value of the attribute of the aggregation unit, a numeric value of the attribute of the aggregation target based on a previously prepared aggregation function to generate a new objective variable candidate.

5. The data analyzing device according to claim 1, wherein the processor is further caused to automatically generate a predetermined period as an aggregation condition when the analysis target data includes a date type attribute.

6. The data analyzing device according to claim 1, wherein the processor is further caused to calculate a score representing usefulness of an objective variable candidate, and display an objective variable candidate having a score calculated by the processor equal to or greater than a predetermined value.

7. The data analyzing device according to claim 6, wherein the processor is further caused to calculate a score based on the number of lines of generated objective variables.

8. The data analyzing device according to claim 6, wherein the processor is further caused to calculate a score based on a variance of the generated objective variables.

9. The data analyzing device according to claim 1, wherein the processor is further caused to delete, after the generation of the plurality of new objective variable candidates, an objective variable candidate that meets a predetermined condition.

10. The data analyzing device according to claim 1, wherein the processor is further caused to automatically generate a new feature value by applying a predetermined function to attributes excluding at least a part of attribute values of attributes of the aggregation target used when generating the new selected objective variable.

11. The data analyzing device according to claim 1, wherein the processor is further caused to automatically generate a new feature value by applying a predetermined function to the original attribute or a combination of a plurality of attributes included in the analysis target data, and exclude from the generated feature values the feature value including information of at least a part of attribute values of attributes of the aggregation target used for the selected new objective variable to generate a final feature value.

12. The data analyzing device according to claim 1, wherein the processor is further caused to receive an input of keyword information from a user, and display an objective variable candidate related to the keyword information input by the user.

13. The data analyzing device according to claim 1, wherein the processor is further caused to receive a selection input from a user regarding an attribute of an aggregation target or an aggregation unit, and display an objective variable candidate generated by using an attribute input by the user as an aggregation target or an aggregation unit.

* * * * *